US008040883B2

(12) United States Patent
Keeler et al.

(10) Patent No.: US 8,040,883 B2
(45) Date of Patent: Oct. 18, 2011

(54) PROBE INSERTION FOR ONE OR MORE NETWORK ADDRESS TRANSLATED ADDRESSES

(75) Inventors: James D. Keeler, Austin, TX (US); Mathew M. Krenzer, Cedar Park, TX (US); Tyler Eschenroeder, Austin, TX (US); Todd L. Mathis, Austin, TX (US)

(73) Assignee: Wayport, Inc., Irving, TX (US)

( * ) Notice: Subject to any disclaimer, the term of this patent is extended or adjusted under 35 U.S.C. 154(b) by 160 days.

(21) Appl. No.: 12/254,403

(22) Filed: Oct. 20, 2008

(65) Prior Publication Data

US 2009/0103539 A1 Apr. 23, 2009

Related U.S. Application Data

(60) Provisional application No. 60/981,260, filed on Oct. 19, 2007.

(51) Int. Cl.
*H04L 12/56* (2006.01)
*H04L 12/66* (2006.01)

(52) U.S. Cl. ........................................ 370/389; 370/401
(58) Field of Classification Search ........................ None
See application file for complete search history.

(56) References Cited

U.S. PATENT DOCUMENTS

| | | | | |
|---|---|---|---|---|
| 5,594,796 A * | 1/1997 | Grube et al. | ............. | 380/270 |
| 6,112,251 A * | 8/2000 | Rijhsinghani | ............. | 709/249 |
| 6,567,857 B1 * | 5/2003 | Gupta et al. | ............. | 709/238 |
| 6,693,878 B1 * | 2/2004 | Daruwalla et al. | ............. | 370/235 |
| 6,701,374 B2 * | 3/2004 | Gupta et al. | ............. | 709/238 |
| 6,754,211 B1 * | 6/2004 | Brown | ............. | 370/389 |
| 7,031,311 B2 * | 4/2006 | MeLampy et al. | ............. | 370/392 |
| 7,633,943 B2 * | 12/2009 | MeLampy et al. | ............. | 370/392 |
| 7,640,194 B2 * | 12/2009 | Bodin et al. | ............. | 705/28 |
| 7,680,104 B2 * | 3/2010 | Shore | ............. | 370/389 |
| 7,706,363 B1 * | 4/2010 | Daniel et al. | ............. | 370/389 |
| 2003/0174706 A1 * | 9/2003 | Shankar et al. | ............. | 370/393 |
| 2006/0291473 A1 * | 12/2006 | Chase et al. | ............. | 370/395.5 |
| 2008/0175239 A1 * | 7/2008 | Sistanizadeh et al. | ............. | 370/390 |
| 2008/0225857 A1 * | 9/2008 | Lange | ............. | 370/395.5 |
| 2008/0279196 A1 * | 11/2008 | Friskney et al. | ............. | 370/395.53 |
| 2009/0122801 A1 * | 5/2009 | Chang | ............. | 370/395.53 |

\* cited by examiner

*Primary Examiner* — Gregory Sefcheck
(74) *Attorney, Agent, or Firm* — Yudell Isidore Ng Russell PLLC

(57) ABSTRACT

In various embodiments, one or more methods and/or systems described may provide probing and/or data replication capabilities for monitoring a user's computing device and the data the user's computing device transmits and/or receives to and/or from one or more networks. In some embodiments, an authorization signal may be intercepted, where the authorization signal may convey information about the user and/or the user's computing device, and a probe to replicate data to and/or from the user's computing device may be initiated. In various embodiments, the replicated data may be communicated to a mediation computing device, where one or more analyses may be performed.

32 Claims, 13 Drawing Sheets

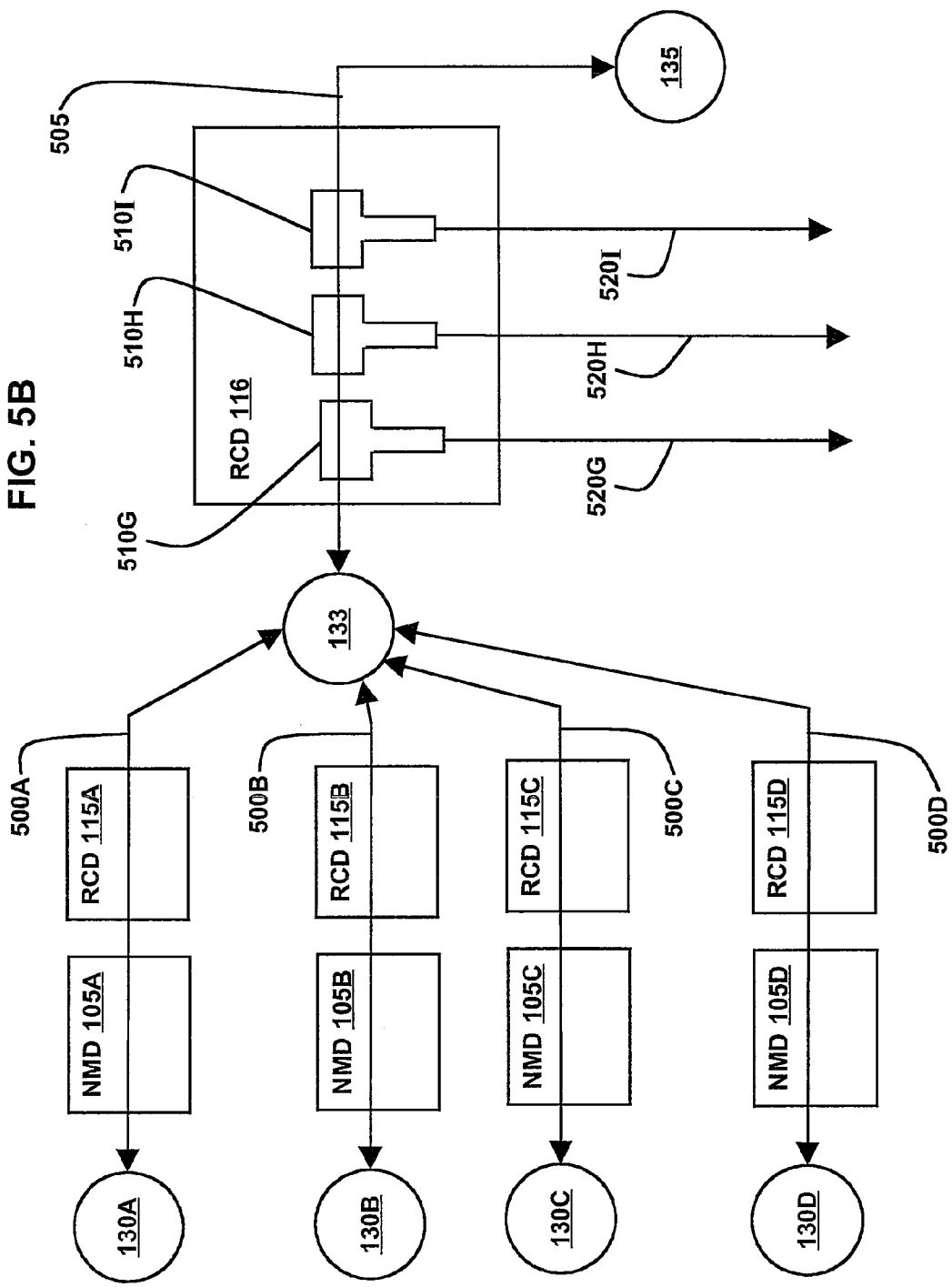

the … detailed description and upon reference

PROBE INSERTION FOR ONE OR MORE NETWORK ADDRESS TRANSLATED ADDRESSES

PRIORITY CLAIM

This application claims benefit of U.S. Provisional Application Ser. No. 60/981,260, filed Oct. 19, 2007, titled "PROBE INSERTION FOR NAT IP ADDRESSES," the contents of which is incorporated herein by referenced in its entirety.

BACKGROUND

1. Field of the Invention

The present invention is in the field of Internet access and, more specifically, the present invention pertains to the field of Internet access where network address translation is used in providing Internet access.

2. Description of the Related Art

The COMMUNICATIONS ASSISTANCE FOR LAW ENFORCEMENT ACT (CALEA) presents many challenges for networking companies. One challenge to conformance with CALEA is that many networks utilize Internet protocol (IP) addresses with network address translation (NAT), e.g., using one or more private addresses such as those in accordance with RFC 1918 and/or one or more static IP address of respective one or more computing devices. Probes for detecting and duplicating the traffic stream are located in centralized network routers and only are aware of the wide area network (WAN) IP address, not IP address where NAT was used. CALEA states that there can be no mixed streams of information, meaning if two or more users are at a site with network address translated (NATed) IP addresses that get translated to the same WAN IP address, any probe looking at the WAN IP address will detect the traffic for all NATed users and cannot differentiate and/or isolate different user data streams to different users' computing devices. This problem can be seen in the example of a network architecture using NATed addressing in FIG. 1.

As shown in FIG. 1, an exemplary prior art network communication system (NCS) 50 includes one or more portable computing devices (PCDS) 20A-20C coupled to a network 15 (e.g., a local area network) that is coupled to a routing computer 10, and routing computer 10 is coupled to an Internet 25. Various computing devices, such as portable computing device (PCD) 20D and servers 35A and 35B, are coupled to Internet 25, as well. A mediation computing device (MCD) 30 can be coupled to Internet 25 or can be coupled to other networks (mediation server 30 coupling not shown). A probe 40A can be disposed between routing computer 10 and Internet 25. Probe 40A can replicated data passing between routing computer 10 and Internet 25 and transmit the replicated data 45A to mediation server 30. However, if one or more of PCDs 20A-20C are communicating with Internet 25 (e.g., to another computing device coupled to Internet 25) using a NAT, then it may be difficult, if not impossible, to distinguish and/or isolate any data stream from and/or to a specific PCD of PCDs 20A-20C, since all the data streams involved with NAT would appear to be from and/or to routing computer 10. Moreover, a probe 40B placed somewhere in Internet 25 can replicate data passing between routing computer 10 and one or more computing devices coupled to Internet 25 and transmit the replicated data 45B to MCD 30. However, this configuration suffers from the same problems associated with probe 40A and replicated data 45A.

Accordingly, there is a need for one or more systems and/or methods to isolate data from and/or to one or more computing devices where NAT is used.

BRIEF DESCRIPTION OF THE DRAWINGS

The preferred embodiments will become apparent upon reading the following detailed description and upon reference to the accompanying drawings in which:

FIG. 5B is a block diagram of probes, according to various embodiments;

Figure 1:
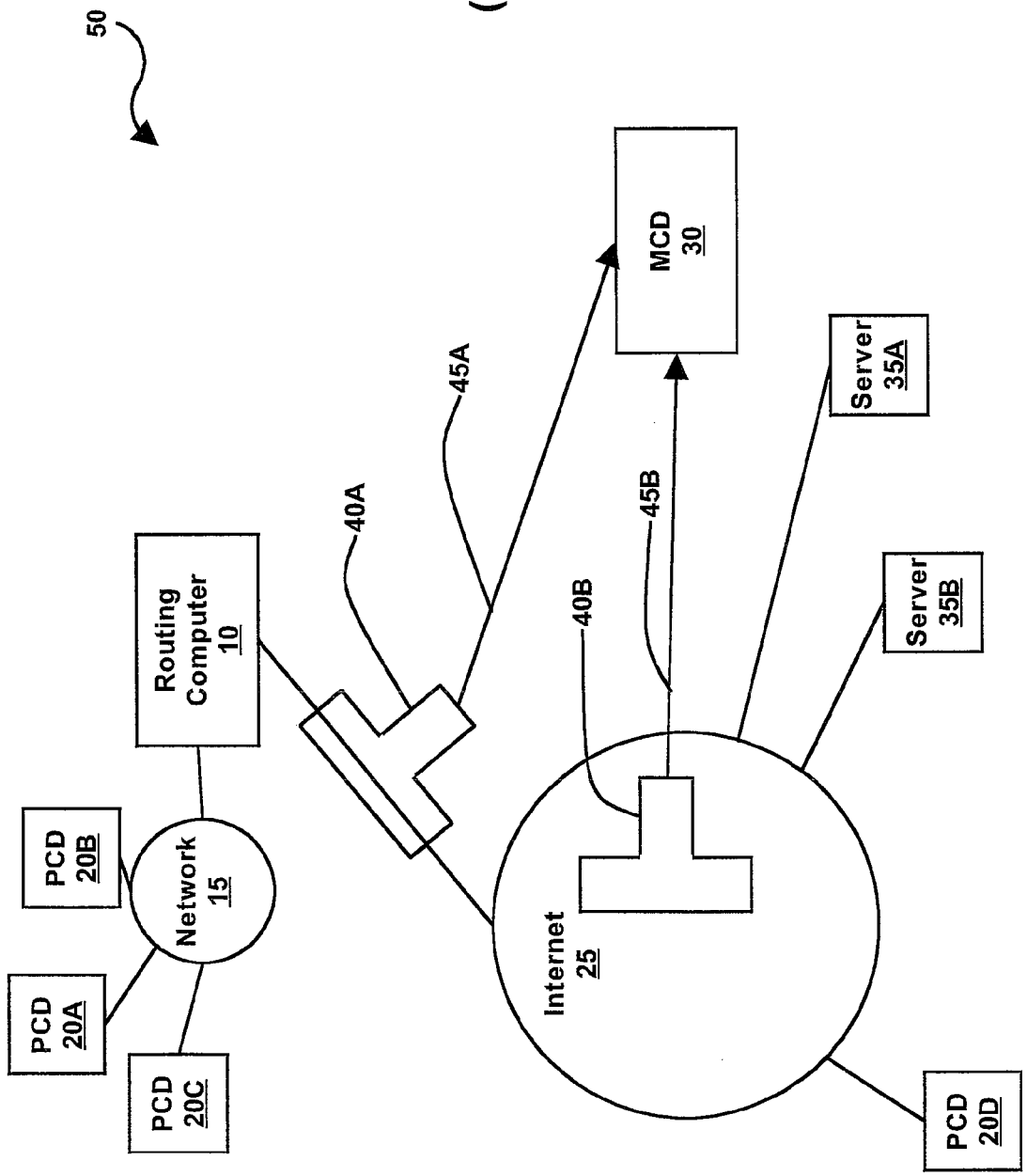
FIG. 1 is an example of a network architecture in the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

U.S. Provisional Application Ser. No. 60/981,260, filed Oct. 19, 2007, titled "PROBE INSERTION FOR NAT IP ADDRESSES," is hereby incorporated by reference in its entirety as though fully and completely set forth herein.

Figure 2:
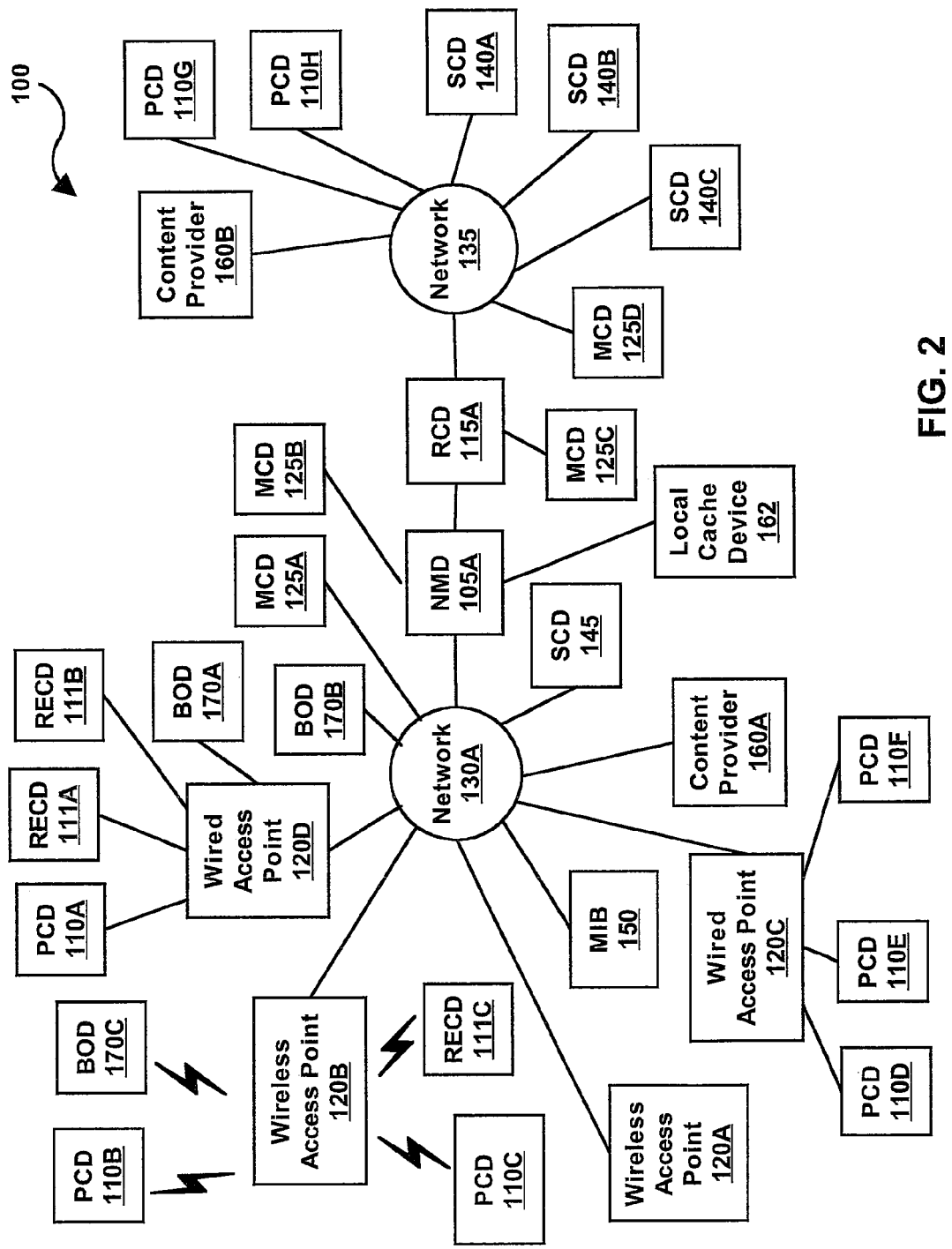
FIG. 2 is a block diagram of a network communication system, according to various embodiments.

Turning now to FIG. 2, a network communication system (NCS) 100 is illustrated, according to various embodiments. NCS 100 may include one or more access points (APs) such as APs 120A-120D. In various embodiments, wired APs 120C-120D may each communicate with one or more computing devices in a wired fashion. For example, wired access point (AP) 120C may communicate with portable computing devices (PCDs) 110D-110F in a wired fashion, and wired AP 120D may communicate with portable computing device (PCD) 110A in a wired fashion. In some embodiments, wireless APs 120A-120B may each communicate with one or more computing devices in a wireless fashion. For example, wireless AP 120B may communicate with a PCD 110B and/or a PCD 110C, and wireless AP 120A may communicate with other computing devices. Each of wireless APs 120A-120B may include a wireless transceiver and may operate according to one or more wireless standards, such as Institute of Electrical and Electronics Engineers (IEEE) 802.16, wireless Ethernet (IEEE 802.11), Bluetooth (IEEE 802.15), General Packet Radio Service (GPRS), CDMA (code division multiple access), TDMA (time division multiple access), FDMA (frequency division multiple access), ultra wide band, digital, and/or infrared communication technologies, among others.

Each of APs 120A-120D may be coupled to a network 130A. Network 130A may be coupled to a network management device (NMD) 105A. NMD 105A may be coupled to a routing computing device (RCD) 115, and RCD 115 may be coupled to a network 135. In various embodiments, NMD 105A may provide authentication, quality of service (QoS), communication traffic shaping, and/or access control from one or more computing devices (e.g., PCDs 110A-110F, retail entity computing devices (RECDs) 111A-111C, and back office devices (BODs) 170A-170C) coupled to network 130A through one of APs 120A-120D to network 135. In some embodiments, NMD 105A may include an access control mechanism and/or a firewall mechanism. For example, the access control mechanism and/or the firewall mechanism may be used in conducting data communications in accordance and/or in association with providing various network accesses, qualities of services, and/or traffic shaping.

In various embodiments, network 130A and/or network 135 may include a wired network, a wireless network or a combination of wired and wireless networks. Network 130A and/or network 135 may include and/or be coupled to various types of communications networks, such as a public switched telephone network (PSTN), an Internet, a wide area network (WAN) (e.g., a private WAN, corporate WAN, etc.), a local area network (LAN). Thus, NMD 105A may be coupled to a PSTN, e.g., Ethernet cable and DSL; a cable (television) based network; a satellite-based system; and/or a fiber based network; among others.

In some embodiments, network 130A and/or network 135 may include one or more wireless networks, e.g., based on IEEE 802.11 and/or IEEE 802.16. For instance, one or more wired and/or wireless APs 120A-120D may be coupled to network 130A in a wireless fashion. Network 130A and/or network 135 may include one or more DSL (digital subscriber line) and/or cable (e.g., cable television) networks and/or infrastructures. For example, network 130A and/or network 135 may include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In various embodiments, network 135 may form part of the Internet, or may couple to other networks, e.g., other local or wide area networks such as the Internet.

In various embodiments, access to these networks may include one or more "services" these networks may provide. For example, these one or more services may include: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and/or video, among others. In some embodiments, these one or more service may be associated with and/or correspond to one or more protocols of one or more computer and/or software applications.

NCS 100 may include one or more content providers 160A-160B. In some embodiments, content provider 160A may be coupled to network 130A. In some embodiments, content provider 160B may be coupled to network 135. Content provider 160A and/or content provider 160B may provide content such as audio, video, text, pictures, and/or maps among others through one or more protocols. Some or all of the information from content provider 160A and/or content provider 160B may be pre-distributed to a local cache device 162 (such as a computer system, a computer hard drive, and/or other memory media) which may facilitate faster local access to the content and/or which may minimize delays and/or costs of transmitting the content through a network, such as network 135.

The content may be based on a retail entity and/or one or more promotions of the retail entity. For example, the content may be entertainment type content to entice customers into the retail entity locations. For example, for a fast food restaurant, such as a McDonalds, content may be provided that is geared to children, such as games based on current McDonalds promotions and/or themes, etc. In some embodiments, network access to this type of enticement content may be given freely to purchasing customers to entice them to visit the retail location. This type of network content may be provided in lieu of traditional "plastic toys" or other items routinely given out to children in these restaurants.

In some embodiments, content provider 160A and/or content provider 160B may provide content that may be used by a business itself, e.g., content to train employees of the retail entity and/or provide necessary business information. In some embodiments, NMD 105A may include content provider 160A or the content and/or functionality of content provider 160A. A portion or all of the content may be cached on the local cache device 162.

In some embodiments, one or more back office devices (BODs) 170A-170C may be coupled to network 130A. For example, one or more of a BODs 170A-170C may include a cash register, a point of sale (POS) terminal, a smart card reader, a camera, a bar code reader, a radio frequency identification (RFID) reader, a credit card reading mechanism, and/or a remote order placing device, among others. In some embodiments, the remote order placing device may allow a retail entity to remotely accept orders from customers using the remote order placing device. For example, a customer may use a "drive-thru" window and the remote order placing device at one location, and the retail entity may accept the order at another location. For instance, the retail entity may accept orders in a first city from customers using the remote order placing device in a different second city.

In various embodiments, one or more of BODs 170A-170C may be configured to contact a clearinghouse through one or more networks (e.g., one or more of networks 130A and/or 135) to debit one or more credit and/or debit card accounts. One or more of BODs 170A-170C may include other mechanisms to identify a customer and/or customer account information. The POS terminal may include a smart card reader. In some embodiments, a back office device (BOD) may be coupled to a network through a wired AP. For example, BOD 170A may be coupled to network 130A through wired AP 120D. In various embodiments, a BOD may be coupled to a network in a wireless fashion. For example, BOD 170C may be coupled to network 130A through wireless AP 120B.

In some embodiments, a retail entity computing device (RECD) may be coupled to network 130A. Retail entity computing devices (RECDs) 111A-111B may be coupled to network 130A in a wired fashion (e.g., through wired AP 120D) while RECD 111C may be coupled to network 130A in a wireless fashion (e.g., through wireless AP 120B). A retail entity may provide RECDs 111A-111C at various locations of the retail entity. RECDs 111A-111C may be used by customers of the retail entity to access content and/or network services offered at the various locations. In various embodiments, the retail entity may distribute access codes, and the access codes may be used to authenticate a user for service. For example, an access code may be used to authenticate a user for access to network 135. One or more of RECDs 111A-111C may be "locked down" to prevent theft.

The retail entity may distribute access codes to access content through one or more of RECDs 111A-111C. For example, a customer of the retail entity may receive an access code and use the access code with RECD 111B to access content from one or more of content providers 160A-160B. In various examples, the content may include audio, video, maps, pictures, and/or text, among others. For instance, the content may include a movie trailer, a music video, a computer-implemented game, web pages, graphics, a digital news publication, and/or a digital magazine, among others. Some or all of the content may be cached on a local cache device 162. The content cache may be updated, replaced, or added to based on various factors including the date of the content (e.g. digital magazines and/or digital newspapers may be updated once/day or once/week), the local demographics or local area attractions, size of the data, available bandwidth for download, and/or other scheduled mechanism for updating the cached content.

In some embodiments, NCS 100 may include a server computing device (SCD) 145 coupled to network 130A. SCD 145 may store and/or provide various shared secrets to various computing devices coupled to network 130A. In various embodiments, SCD 145 may communicate with various computing devices coupled to network 130A using use one or more secure and/or encrypted methods and/or systems. For example, SCD 145 may communicate with various computing devices coupled to network 130A using transport layer security (TLS), HTTPS (secure hypertext transfer protocol), and/or a secure socket layer (SSL), among others.

In some embodiments, NCS 100 may include one or more server computing devices (SCDs) 140A-140C and/or one or more PCDs 110G-110H coupled to network 135. In one example, SCD 140A may include various authentication and/or authorization services used in providing access from network 130A to network 135. In a second example, one or more of SCDs 140B-140C may provide content and/or other network services described herein. For instance, SCD 140B may provide SCD 145 with one or more shared secret updates. SCD 140B and SCD 145 may communicate in a secure fashion (e.g., using TLS, HTTPS, SSL, etc.). In another example, one or more PCDs 110G-110H may exchange data associated with one or more network services described herein. In various embodiments, one or more computing devices coupled to network 130A may be permitted to access and/or communication with computing devices coupled to network 135 after being permitted to do so.

NCS 100 may include a management information base (MIB) 150. MIB 150 may be coupled to network 130A. In various embodiments, MIB 150 may be a mechanism, such as a memory, which may allow the persistent storage and management of information that may be used by network 130A to operate. In some embodiments, MIB 150 may store a data structure, such as a table comprising a list of identification information and a corresponding list of two or more possible networks and/or services. The data structure may also store access information, which may include associated methods for providing data to/from the respective two or more possible networks and/or services. The access information may include access level and/or privilege level information. The data structure may include a table of two or more tuples, with each tuple including the identification information. In various embodiments, the data structures that store this information may be included in each of the APs 120A-120D, or may be provided in various other locations.

MIB 150 may store other information, such as a directory of one or more of the elements (e.g., access points, computing devices, etc) in NCS 100, network topology information, characteristics of individual network elements, characteristics of connection links, performance and trend statistics, and/or any information that may be of interest in operating network 130A. For example, MIB 150 may store longitude, latitude, altitude and/or other geographic information that may be used to locate one or more access points and/or one or more geographic regions.

In some embodiments, NMD 105A may be a computer system operable to include one or more of MIB 150, network 130A, SCD 145, RCD 115, MCDs 125A-125D, various networking equipment, and/or one or more APs 120A-120D, among others.

In various embodiments, a user operating a computing device (e.g., one of PCDs 110A-110F) may communicate with one of the APs 120A-120D to gain access to a network and its services, such as the Internet. One or more of PCDs 110B-110C may have a wireless communication device, e.g., a wireless Ethernet card, for communicating with one or more of the wireless APs 120A-120B. One or more of PCDs 110A and 110D-110F may have a wired communication device, e.g., an Ethernet card, for communicating with one or more of the wired APs 120C-120D. In various embodiments, one or more of PCDs 110A-110F may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, or other wired or wireless device. One or more of PCDs 110-110F, RECDs 111A-111C, BODs 170A-170C, and/or content provider 160A may include various wireless or wired communication devices, such as a wireless Ethernet card, paging logic, RF (radio frequency) communication logic, a wired Ethernet card, a modem, a DSL device, an ISDN device, an ATM (asynchronous transfer mode) device, a parallel and/or serial port bus interface, and/or other type of communication device.

In some embodiments, one or more of PCDs 110A-110F, RECDs 111A-111C, BODs 170A-170C, and/or content provider 160A may include a memory medium which stores identification (ID) information and/or shared secret information. The identification information may be a System ID (an IEEE 802.11 System ID), a processor or CPU ID, a Media Access Control (MAC) ID of a wireless or wired Ethernet device (e.g., a MAC address), network identification information, and/or other type of information that identifies the computing device. The identification information may be included in a digital certificate (e.g., an X.509 certificate), which may be stored in a web browser, in a client software, and/or in a memory medium of the computing device. In various embodiments, the shared secret information may be stored in a memory medium of the computing device and may be accessible by client software of the computing device. For example, the shared secret information may include various strings of data that may be combined with other data which may be used in determining a result of a one-way hash function.

In communicating with wireless APs 120A-120B, the wireless communication may be accomplished in a number of ways. In some embodiments, one or more of PCDs 110B-110C, BOD 170C, RECD 111C, and wireless APs 120A-120B may be equipped with appropriate transmitters and receivers compatible in power and frequency range (e.g., 900 MHz, 2.4 GHz, 3.6 GHz, 5 GHz, among others) to establish a wireless communication link. Wireless communication may also be accomplished through cellular, satellite, digital, and/or infrared communication technologies, among others. To provide user identification and/or ensure security, a computing device and/or wireless AP may use any of various security systems and/or methods.

In communicating with wired APs 120C-120D, the wired connection may be accomplished through a variety of different ports, connectors, and/or transmission mediums. For example, one or more PCDs 110A and 110D-110F, RECDs 111A-111B, and BOD 170A may be coupled through an Ethernet, universal serial bus (USB), FireWire (IEEE 1394), serial, and/or parallel transmission cables, among others. One or more of PCDs 110A and 110D-110F may include various communication devices for connecting to one of the wired APs 120C-120D, such as wired Ethernet cards, modems, DSL adapters, ATM adapters, IDSN devices, or other communication devices. In one example, a hotel may have Ethernet connections in the restaurants, shops, meeting rooms, and/or guest rooms. In a second example, a fast-food restaurant and/or a coffee shop may have both wireless and wired connections for mobile users. A user may connect to a wired AP 120C through the use of a laptop computer (e.g., one of PCDs 110D-110F), an Ethernet network card, and a network cable. This connection may have the same impact as a connection made to a wireless AP 120B. In other words, a user using a wired portable computing device may be able to use various network infrastructures in the same manner as a user using a wireless portable computing device.

In some embodiments, access codes to content may be provided to customers with a purchase of goods and/or services. For example, a customer may receive an access code to download a computer-implemented game. The computer-implemented game may be downloaded to one or more of PCDs 110A-110F, for instance. The access code to download a computer-implemented game may be distributed instead of a toy or trinket that may have accompanied a purchase of a meal. The computer-implemented game may include one or more digital rights management schemes. For instance, a digital rights management scheme may provide protection against further distribution of the computer-implemented game, e.g., not allowing distribution of the computer-implemented game to another computing device after it is downloaded. A digital rights management scheme may allow the computer-implemented game to only be played at a location of the retail entity.

In various embodiments, NCS 100 may be geographic-based. In other words, the NCS 100 may provide information and/or services to a computing device (e.g., one of PCDs 110A-110F, RECDs 111A-111C, RECDs 111A-111C, and BODs 170A-170C) based at least partly on the geographic location of the computing device, e.g., as indicated by one or more of Aps 120A-120D and/or as indicated by geographic information (e.g., GPS information, fast-food restaurant and/or coffee shop location, room identification, room number, room name, and/or room area, among others) provided from the computing device. In some embodiments, one or more of APs 120A-120D may be arranged at known geographic locations and may provide geographic location information regarding the geographic location of the user and/or the computing device. In some embodiments, a computing device (e.g., one of PCDs 110A-110F, RECDs 111A-111C, and BODs 170A-170C) may provide geographic location information of the computing device through an access point (e.g., one of APs 120A-120D) to network 130A. For example, the computing device may include GPS (Global Positioning System) equipment enabling the computing device to provide its geographic location through the access point to network 130A.

Figure 3:
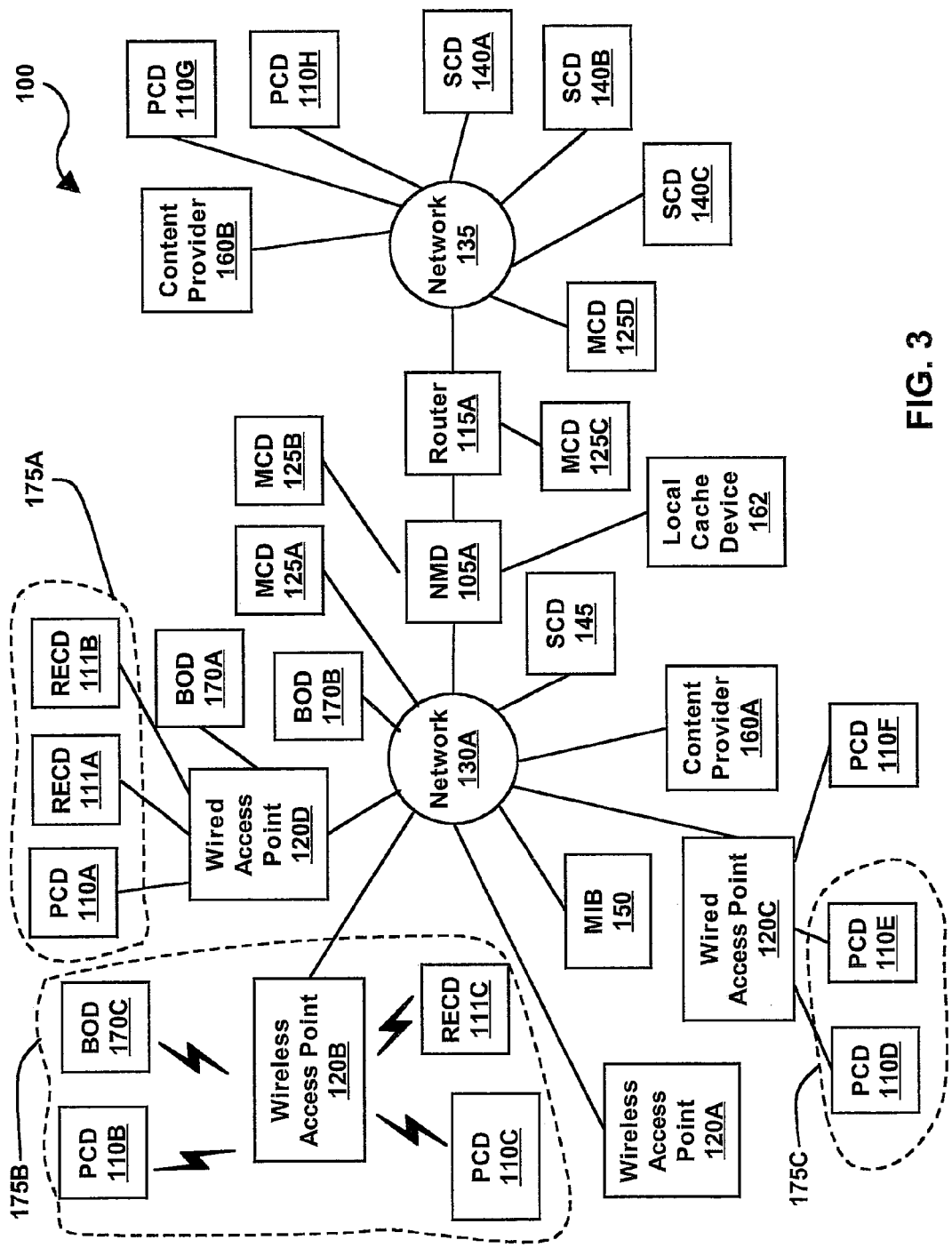
FIG. 3 is a block diagram of a network communication system, according to various embodiments.

In various embodiments, NMD 105A may service a single location. In some embodiments, NMD 105A may service two or more locations (e.g., locations 175A-175C), as shown in FIG. 3. For instance, each of various locations 175A-175C may include a portion of NCS 100. As described herein, a geographic location may include a geographic region. For instance, locations 175A-175C may be referred to as geographic locations and/or geographic regions, and they may include one or more areas of one or more sizes. In one example, location 175C may include a meeting room. In second example, location 175A may include a retail entity location, such as a coffee shop, a sandwich shop, a McDonalds location, etc. In another example, location 175B may include a city. More information regarding geographic location information may be found in U.S. Pat. No. 5,835,061.

One or more of the systems described herein, such as PCDs 110A-110H, APs 120A-120D, BODs 170A-170C, MIB 150, content providers 160A-160B, server computing devices (SCDs) 140A-140C, and NMD 105A may include a memory medium on which computer programs and/or data according to the present invention may be stored. For example, each of the APs 120A-120D, and/or MIB 150 may store a data structure as described above including information regarding identification information, application identification information, protocol identification information, corresponding networks, and/or access information such as associated data routing and/or QoS methods. Each of the APs 120A-120D, and/or MIB 150 may further store a software program for accessing these data structures and using the information therein to properly provide and/or route data between computing devices and networks, and/or to selectively provide and/or route data depending on the access information and/or the QoS. In various embodiments, various of the systems and/or methods described herein may be used to provide network access from a first network to a second network. For example, the first network may include network 130A, and the second network may include network 135.

In some embodiments, one or more computer systems may communicate with the one or more other computer systems using use one or more secure and/or encrypted methods and/or systems. For example, PCD 110A may communicate with the one or more computer systems (e.g., PCDs 110B-110H, NMD 105A, SCDs 145, 140A-140C, and/or content providers 160A-160B) using TLS, HTTPS, and/or a SSL, among others.

The term "memory medium" and/or "computer readable medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium may include other types of memory as well, or combinations thereof. In some embodiments, the memory medium may be and/or include an article of manufacture and/or a software product. In addition, the memory medium may be located in a first computer in which the programs are executed, or may be located in a second different computer and/or hardware memory device that connects to the first computer over a network. In some embodiments, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may include one of the networks to which the current network is coupled, e.g., a SAN (Storage Area Network).

In various embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

The memory medium in one or more systems thus may store a software program and/or data for performing and/or enabling access and/or selective network access and/or network service. A CPU or processing unit in one or more systems executing code and data from a memory medium includes a means for executing one or more software program according to the methods and/or flowcharts described herein.

Figure 4A:
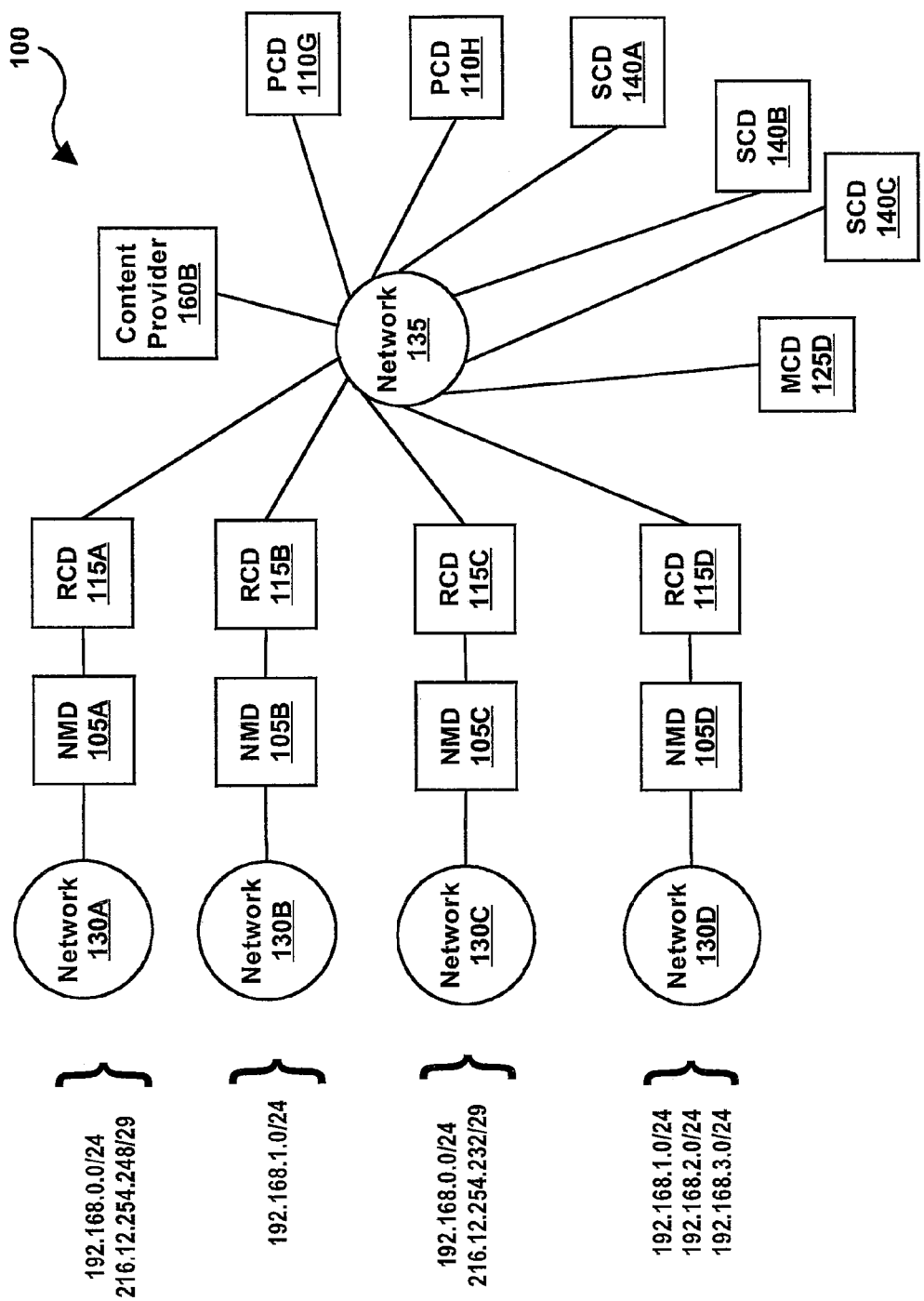
FIG. 4A is a block diagram of a network communication system, according to various embodiments.

Turning now to FIG. 4A, NCS 100 is illustrated, according to various embodiments. NCS 100 may include networks 130A-130D, network management devices (NMDs) 105A-105D, and/or routing computing devices (RCDs) 115A-115D. As illustrated, networks 130A-130D may be coupled to respective NMDs 105A-105D; NMDs 105A-105D may be coupled to respective RCDs 115A-115D; and RCDs 115A-115D may be coupled to network 135. In some embodiments: each network of networks 130B-130D may include structures and/or functionalities as described above with reference to network 130A; each NMD of NMDs 105B-105D may include structures and/or functionalities as described above with reference to NMD 105A; and/or each RCD of RCDs 115B-115D may include structures and/or functionalities as described above with reference to RCD 115A.

In some embodiments, networks 130A-130D may be configured with various subnets. As shown, network 130A may be configured with subnets 192.168.0.0/24 and/or 216.12.254.29/29, network 130B may be configured with a subnet 192.168.1.0/24, network 130C may be configured with subnets 192.168.0.0/24 and/or 216.12.254.232/29, and/or network 130D may be configured with subnets 192.168.1.0/24, 192.168.2.0/24, and/or 192.168.3.0/24. As shown and described, IP version 4 is used for illustrative and/or exemplary purposes, and in various embodiments, other network protocols and/or protocol versions may be used with the one or more systems and/or one or more methods described herein. For example, IP version 6, Ethernet protocol, token ring protocol, ARCnet protocol, fiber distributed data interface (FDDI) protocol, LocalTalk protocol, asynchronous transfer mode (ATM) protocol, frame relay protocol, and/or X.25 protocol, Internet packet exchange (IPX) protocol, among others, may be used with the one or more systems and/or one or more methods described herein.

In various embodiments, various subnets may be considered private subnets that include respective one or more private network addresses. For example, subnets 10.0.0.0/8, 172.16.0.0/12, and/or 192.168.0.0/16 may be considered private subnets that include respective private addresses. Using private subnets may aid and/or be beneficial in conserving public network addresses. In some embodiments, private addresses may not be routed on a public network (e.g., the Internet). For example, routers that interact with and/or form part of a public network may filter out and/or reject packets with a source address and/or a destination address that includes a private network address. In some instances, receiving a packet, from and/or to a public network, with a source address and/or a destination address that includes a private network address may be considered a protocol error. Thus, various gateway devices perform network address translation (NAT) to change and/or map a private network address to a public network address. In performing NAT, a gateway device may change a private network address to a public network address. For example, the gateway device may change the private network address to the public network address that it uses when interacting with the public network.

Figure 4B:
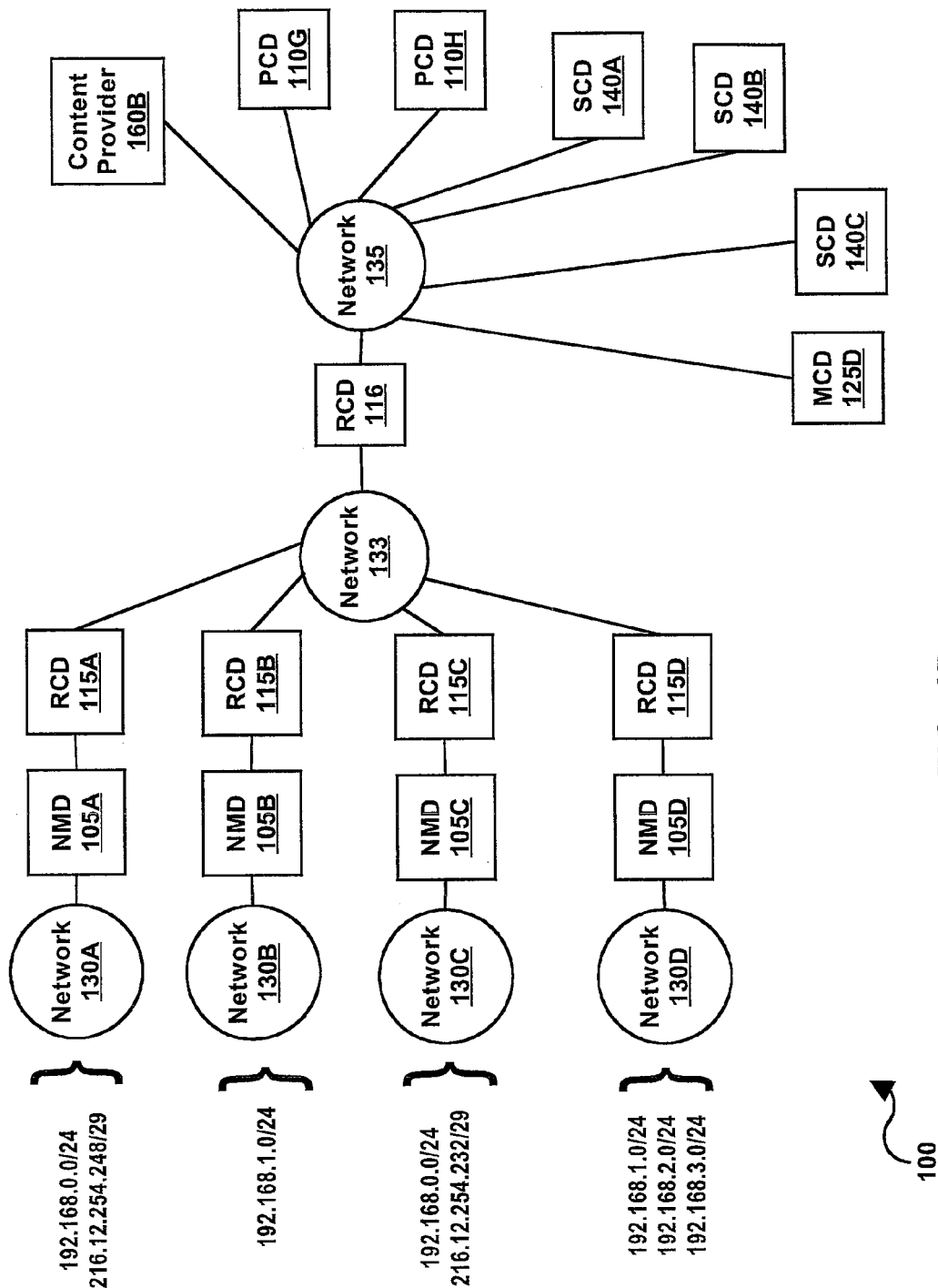
FIG. 4B is a block diagram of a network communication system, according to various embodiments.

Turning now to FIG. 4B, NCS 100 is illustrated, according to various embodiments. As shown, NCS 100 may include the computing systems and networks as described with reference to FIG. 4A and may also include a private network 133 and a RCD 116, where RCDs 115A-115D may be coupled to private network 133 which may be coupled to RCD 116 which may be coupled to network 135.

In various embodiments, private network 133 may include structures and/or functionalities of networks 130A-130D and/or network 135. In some embodiments, private network 133 and/or RCD 116 may aggregate network traffic from and/or to networks 130A-130D and network 135. In one example, RCD 116 may receive network traffic which includes two or more private network addresses. These private network addresses may include the same private network address or may include different private network addresses. Private network 133 and/or RCD 116 may be configured to distinguish two different data streams (e.g., each data stream including one or more packets) even though the same private network address is used. For instance, the two different data streams may be identified by a tag (e.g., a QoS tag, a tunnel tag, a VLAN tag, etc.).

In some embodiments, RCD 116 may map and/or NAT each packet from and/or to two or more private network addresses to a respective public network address. In one example, RCD 116 may receive a packet from a computing device coupled to network 130A, and the packet of the computing device coupled to network 130A may include a source address of 192.168.0.24. RCD 116 may perform a NAT on the packet the computing device coupled to network 130A by changing the source network address from 192.168.0.24 to a public network address, such as 216.12.254.100. RCD 116 may receive a packet from a computing device coupled to network 130B, and the packet the computing device coupled to network 130B may include a source address of 192.168.1.20. RCD 116 may perform a NAT on the packet the computing device coupled to network 130B by changing the source network address from 192.168.1.20 to a public network address, such as 216.12.254.104. In a second example, RCD 116 may receive a packet from a computing device coupled to network 130A, and the packet the computing device coupled to network 130A may include a source address of 192.168.0.24. RCD 116 may perform a NAT on the packet the computing device coupled to network 130A by changing the source network address from 192.168.0.24 to a public network address, such as 216.12.254.100. RCD 116 may receive a packet from a computing device coupled to network 130C, and the packet the computing device coupled to network 130C may include a source address of 192.168.0.24. RCD 116 may perform a NAT on the packet the computing device coupled to network 130C by changing the source network address from 192.168.0.24 to a public network address, such as 216.12.254.105. RCD 116 may distinguish the two different data streams (e.g., two different packets) by a tag. In one instance, each packet associated with each private network address of one or more private network addresses from one or more networks 130A-130D may be associated with a unique tag (e.g., a QoS tag, a tunnel tag, a VLAN tag, etc.), and each unique tag may distinguish each of two or more data streams (e.g., two or more packets) and map and/or NAT these two or more data streams to two or more different public network addresses. In various embodiments, unique tags may be added and/or supplemented to two or more data streams by respective wired access points, wireless access points, and/or NMDs, among others, that may allow the data streams to be communicated to various network elements and/or various networks.

In this fashion, two or more private network addresses may be mapped and/or NATed to respective two or more different public network addresses. This may aid in conserving public network addresses, since public network addresses may not need to be allocated to one or more networks (e.g., networks 130A-130D), and public addresses can be dynamically allocated where they are needed and/or can be dynamically allocated for temporary periods of time when they are needed. Moreover, if more public addresses are needed, e.g., by two or more networks 130A-130D, then configuration and/or reconfiguration may be reduced by configuring and/or reconfiguring RCD 116 without configuring and/or reconfiguring two or more areas and/or devices of NCS 100 (e.g., two or more of networks 130A-130D, two or more of NMDs 105A-105D, and/or two or more of RCDs 115A-115D, among others).

Figure 5A:
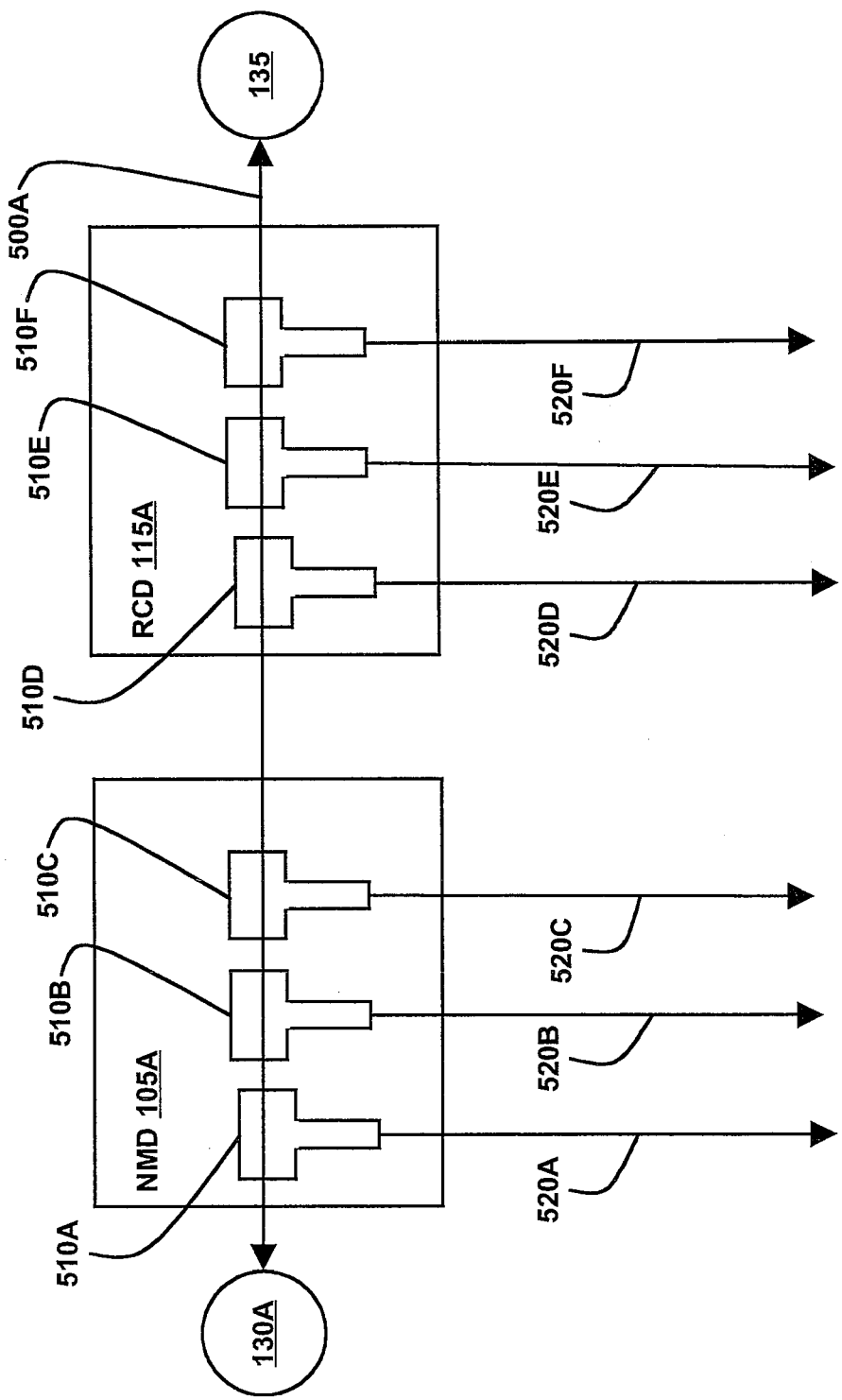
FIG. 5A is a block diagram of probes, according to various embodiments.

Turning now to FIG. 5A, a block diagram of probes is illustrated, according to various embodiments. As shown, NMD 105A and/or RCD 115A may permit and/or enable a bi-directional data stream 500A to stream between network 130A and network 135. One or more probes 510A-510F may be initiated and/or inserted to replicate one or more portions of data stream 500A, and the one or more probes 510A-510F may respectively provide replicated data streams 520A-520F. In some embodiments, one or more of replicated data streams 520A-520F may be communicated to one or more of MCDs 125A-125D. In various embodiments, data streams 520A-520F may replicate all packets associated with a network address, a tag, etc.; provide one or more replicated portions of a data stream; and/or provide supplemental data (e.g., user identification, current location, etc.).

In some embodiments, data stream 500A may include one or more packets, and each of the one or more packets may include one or more of a source address, a destination address, a VLAN tag, a tunnel tag, a quality of service tag, and/or payload data, among others. For example, the one or more packets may include one or more of an IP packet, a wireless Ethernet packet, and/or an Ethernet packet, among others.

In various embodiments, a probe may replicate one or more portions of data stream 500A based on one or more of a network address (e.g., an IP address, a MAC address, etc.) and/or a tag (e.g., a quality of service tag, a tunnel tag, a VLAN tag, etc.), among others. In some embodiments, basing replication on one of more of a network address and/or a tag may include filtering on one or more of the network address and/or the tag such that data associated with the one or more of the network address and/or the tag is replicated while other data is not replicated.

In one example, probe 510A may replicate one or more packets of data stream 500A based on an IP address. In one instance, one or more of probes 510A and/or probe 510D may replicate one or more packets of data stream 500A that are associated with a private IP address, such as 192.168.0.24. In another instance, one or more of probes 510A and/or probe 510D may replicate one or more packets of data stream 500A that are associated with a public IP address, such as 216.12.254.252. In a second example, one or more of probes 510A and/or probe 510D may replicate one or more packets of data stream 500A that are associated with a MAC address (e.g., 00:0d:a3:88:be:fe, among others).

In another example, one or more of probes 510B and/or 510E may replicate one or more packets of data stream 500A that are associated with a tag. In one instance, the one or more packets may be associated with a QoS tag (e.g., an IEEE 802.1p tag). In some embodiments, the QoS tag may be used to identify specific one or more packets from and/or to a specific computing device. In various embodiments, the QoS tag does not reduce a QoS. In one example, one or more of a wireless access point, a wired access point, and/or a NMD may set and/or supplement the specific one or more packets from and/or to the specific computing device with a tag. For instance, NMD 105A may perform NAT on the one or more packets and set and/or supplement the one or more packets with a QoS tag so that probe 510E may identify and/or replicate the one or more packets. In another instance, a wireless access point or a wired access point may set and/or supplement the one or more packets with a QoS tag so that probe 510E may identify and replicate the one or more packets even if NMD 105A performs NAT on the one or more packets.

In various embodiments, NMDs 105B-105D and/or respective RCDs 115B-115D may include structures and/or functionalities with reference to NMD 105A and/or RCD 115A described above.

Turning now to FIG. 5B, a block diagram of probes is illustrated, according to various embodiments. As shown, NMD 105A and/or RCD 115A may permit and/or enable a bi-directional data stream 500A to stream between network 130A and private network 133; NMD 105B and/or RCD 115B may permit and/or enable a bi-directional data stream 500B to stream between network 130B and private network 133; NMD 105C and/or RCD 115C may permit and/or enable a bi-directional data stream 500C to stream between network 130C and private network 133; and/or NMD 105D and/or RCD 115D may permit and/or enable a bi-directional data stream 500D to stream between network 130D and private network 133. In some embodiments, private network 133 and/or RCD 116 may aggregate one or more data streams 500A-500D into a bi-directional data stream 505, and RCD 116 may permit and/or enable bi-directional data stream 505 to stream between private network 133 and network 135.

In various embodiments, one or more probes 510G-510I may be initiated and/or inserted to replicate one or more portions of data stream 505, and the one or more probes 510G-510I may respectively provide replicated data streams 520G-520I. In some embodiments, one or more of replicated data streams 520G-520I may be communicated to one or more of MCDs 125A-125D. In various embodiments, data streams 520G-520I may replicate all packets associated with a network address, a tag, etc.; provide one or more replicated portions of a data stream; and/or provide supplemental data (e.g., user identification, current location, etc.).

In some embodiments, data stream 505 may include one or more packets, and each of the one or more packets may include one or more of a source address, a destination address, a VLAN tag, a tunnel tag, a quality of service tag, and/or payload data, among others. For example, the one or more packets may include one or more of an IP packet, a wireless Ethernet packet, and/or an Ethernet packet, among others.

In various embodiments, a probe (e.g., one of probes 510G-510I) may replicate one or more portions of data stream 505 based on one or more of a network address (e.g., an IP address, a MAC address, etc.) and/or a tag (e.g., a quality of service tag, a tunnel tag, a VLAN tag, etc.), among others. In some embodiments, basing replication on one of more of a network address and/or a tag may include filtering on one or more of the network address and/or the tag such that data associated with the one or more of the network address and/or the tag is replicated while other data is not replicated.

In one example, probe 510G may replicate one or more packets of data stream 505 based on a network address (e.g., an IP address). In one instance, probe 510G may replicate one or more packets of data stream 505 that are associated with a private IP address, such as 192.168.0.24. In another instance, probe 510G may replicate one or more packets of data stream 505 that are associated with a public IP address, such as 216.12.254.252. In a second example, probe 510G may replicate one or more packets of data stream 505 that are associated with a MAC address (e.g., 00:0d:a3:88:be:fe, among others).

In another example, probe 510H may replicate one or more packets of data stream 505 that are associated with a tag. In one instance, the one or more packets may be associated with a QoS tag (e.g., an IEEE 802.1p tag). In some embodiments, the QoS tag may be used to identify specific one or more packets from and/or to a specific computing device. In various embodiments, the QoS tag does not reduce a QoS. In one example, one or more of a wireless access point, a wired access point, and/or a NMD (e.g., on of NMDs 105A-105D) may set and/or supplement the specific one or more packets from and/or to the specific computing device with a QoS tag. For instance, NMD 105A may perform NAT on the one or more packets and set and/or supplement the one or more packets with a QoS tag so that probe 510H may identify and/or replicate the one or more packets associated with the tag. In another instance, a wireless access point or a wired access point may set and/or supplement the one or more packets with a QoS tag so that probe 510H may identify and replicate the one or more packets even if NMD 105A performs NAT on the one or more packets.

In some embodiments, each of one or more private network addresses of one or more networks 130A-130D may be tunneled from respective NMDs 105A-105D and/or RCDs 115A-115D to RCD 116. In one example, RCD 116 may receive network traffic which includes two or more private network addresses. These private network addresses may include the same private network address or may include different private network addresses. Private network 133 and/or RCD 116 may be configured to distinguish two or more different data streams (e.g., each data stream including one or more packets) even though the same private network address is used. For instance, the two or more different data streams may be identified by respective two or more different tunnels and/or two or more different tunnel tags. In various embodiments, RCD 116 may map and/or NAT each packet from and/or to the two or more different tunnels and/or the two or more different tunnel tags to different respective public network addresses.

In various embodiments, NMDs 105B-105D and/or respective RCDs 115B-115D may include structures and/or functionalities with reference to NMD 105A and/or RCD 115A described above. In some embodiments, one or more probes 510A-510I may be implemented with hardware and/or one or more executable instructions executable by a processor from a memory medium in accordance with one or more systems and/or one or more methods described herein.

Figure 6:
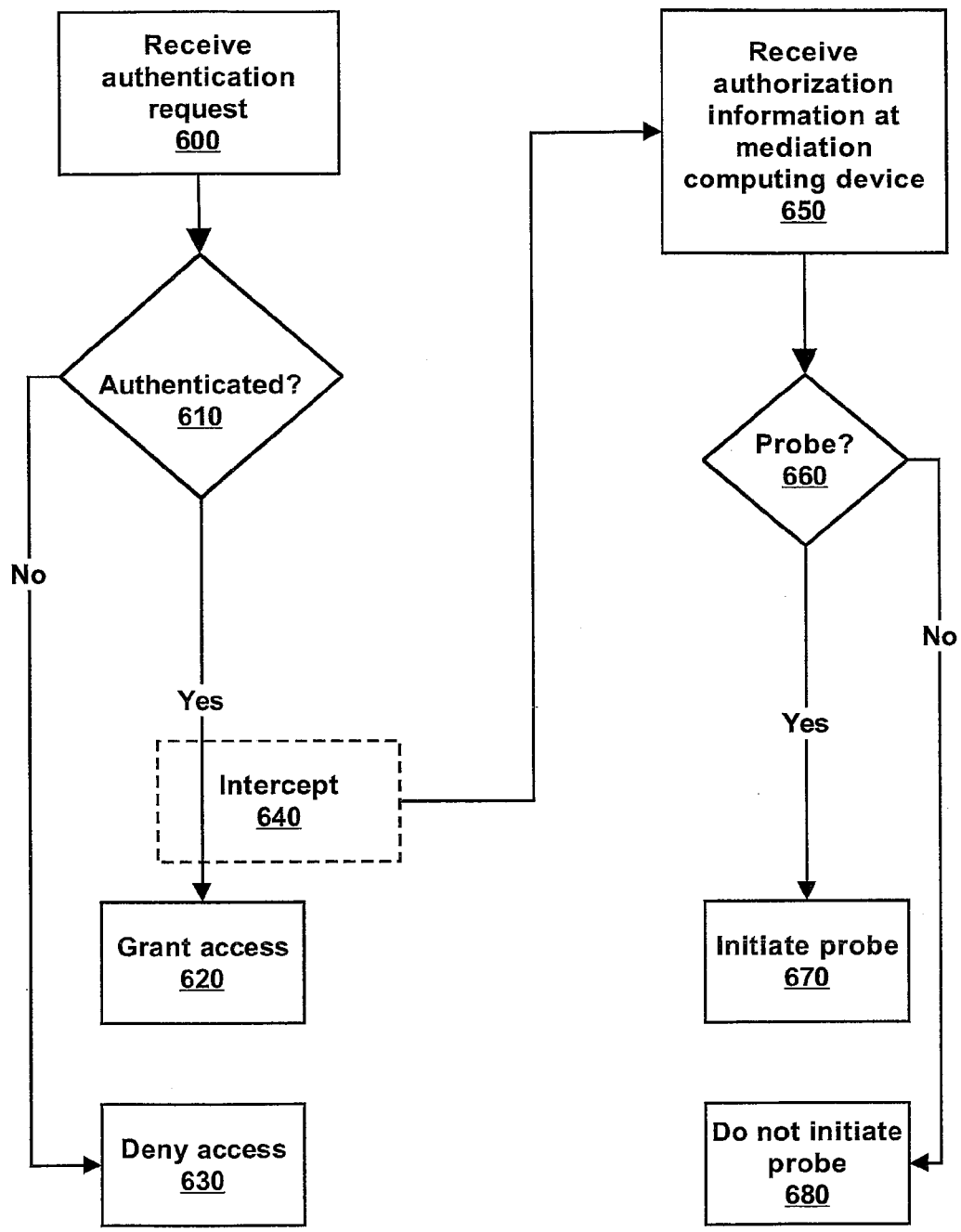
FIG. 6 is a flowchart diagram of a method, according to various embodiments.

Turning now to FIG. 6, a flowchart diagram of a method is illustrated, according to various embodiments. At 600, an authentication request may be received. The authentication request may be an authentication request for network access and/or network services. For example, the authentication request may be for access of network 135. In some embodiments, a NMD (e.g., one of NMD 105A-105D) may receive the authentication request. In various embodiments, a SCD (e.g., one of SCDs 140A-140C) may receive the authentication request.

In some embodiments, one or more of SCDs 140A-140C and/or one or more of NMDs 105A-105D may include authentication, authorization, and/or accounting (or "AAA") processes and/or services. RADIUS (Remote Authentication Dial-In User Service) is an example of an AAA service used by various Internet Service Providers (ISPs). (The RADIUS specification is maintained by a working group of the Internet Engineering Task Force, the main standards organization for the Internet, e.g., see RFC 2865 and RFC 2866.) In one example, a user may connect a computing device to an Internet service provider (ISP), the user's username and password may be transmitted to an AAA server (e.g., a RADIUS server) and/or to an AAA interface server (e.g., a web server). The AAA server may then check that the information is correct and authorize access to the ISP's system and/or services. Other protocols for providing an AAA framework may include DIAMETER (an extension of RADIUS), EAP (Extensible Authentication Protocol), TACACS (Terminal Access Controller Access Control System), TACACS+, and/or XTACAS, 802.1x, WPA, 802.11i, among others. In various embodiments, these may also be used for applications, such as access to network service and/or IP mobility, and are intended to work in both local AAA and roaming situations.

In one example, AAA processes and/or services of SCD 140A-140C and/or NMDs 105-105D may receive a username and a password of a user operating a computing device. The username may include a realm (e.g., "Wellcent") that may indicate a roaming partner and/or network provider associated with an operator of one or more portions NCS 100.

In some embodiments, a computing device (e.g., one of SCDs 140A-140C and/or NMDs 105A-105D) may proxy one or more AAA requests to another computing device. In one example, NMD 105A may proxy one or more AAA requests to SCD 140A. In another example, SCD 140A may proxy one or more AAA requests to SCD 140B.

In various embodiments, AAA processes and/or services may include receiving one or more access codes, one or more coupons, and/or one or more credit card numbers, among others. In one example, NMD 105A may receive credit card information in the authentication request. In another example, SCD 140A may receive credit card information in the authentication request.

Next at 610, it may be determined if the computing device is authenticated for network access and/or network services. In some embodiments, a username and/or a password may be checked against a database. For example, if the username and/or the password are valid the computing device may be authenticated. In various embodiments, a username and/or a password may be proxied to another computing device. In some embodiments, credit card information may be sent to a credit card clearing house to determine if the credit card information is authenticated and, therefore, if the computing device is authenticated for network access and/or network services.

If the computing device is authenticated for network access, then the method may proceed to 620 where access is granted. If the authentication fails and/or is denied, then network access may be denied at 630.

At 640, an authorization signal and/or message may be intercepted. In some embodiments, a computing device (e.g., one of SCDs 140A-140C) may provide a NMD (e.g., one of NMDs 105A-105D) with authorization information included in a signal and/or message to grant a computing device access to one or more networks and/or one or more networks services. In various embodiments, intercepting the authorization signal and/or message may include receiving one or more replicated portions of the authorization signal. For example, an AAA server (e.g., one of SCDs 140A-140C) may transmit the one or more replicated portions of the authorization signal, and/or a MCD (e.g., one of MCDs 125A-125D) may receive the one or more replicated portions of the authorization signal and/or message.

In some embodiments, the authorization information may include one or more name-value pairs. For example, the name-value pairs may include one or more name value pairs of Table 1, below.

TABLE 1

| Name | Value |
|---|---|
| NmdID | 524 |
| MacAddress | 00:0d:a3:88:be:fe |
| IPAddress | 192.168.0.34 |
| PortType | Guest |
| PortLocation | Room321 |
| UserName | Wellcent/jdoe |
| WPFlags | 0x320f |
| WPtag | 0x000b |
| WPHash | 0x093dd7f30cd7cd8c71d01843f1c47c1b |

The authorization information may include other information and/or other name-value pairs that are not shown in Table 1. In some embodiments, the authorization information may be communicated via RADIUS signaling. For example, the authorization information may be communicated in one or more vendor specific attributes (VSAs). In various embodiments, the authorization information may be communicated with some network protocol and/or system that allow an AAA server (e.g., one of SCDs 140A-140C) to communicate with an access control computing device (e.g., one of NMDs 105A-105D). In some embodiments, the authorization information may be communicated using a hypertext transfer protocol (HTTP) or a secure HTTP (HTTPS), among others.

At 650, the authorization information may be received. In some embodiments, a MCD (e.g., one of MCDs 125A-125D) may receive the authorization information or receive one or more portions of the authorization information.

At 660, it may be determined whether or not a probe is to be initiated to monitor and/or replicate network traffic of the computing device that was granted access. In various embodiments, determining whether or not a probe is to be initiated may be based on one or more portions of the authorization information. In one example, determining whether or not a probe is to be initiated may include being based on one or more of: a user identification (e.g., UserName), a network address or network identification (e.g., MacAddress, IPAddress, etc.), a location (e.g., PortLocation), and/or one or more flags (e.g., WPFlags).

In some embodiments, one or more flags may indicate that a probe is to be initiated to monitor and/or replicate network traffic of a computing device. For example, the WPFlags value of 0x320f may represent a hexadecimal value where each bit of the value may be associated with a specific flag. In various embodiments, in determining authentication, at 610, credit card information may be sent to a clearing house for authorization, and information may be received from the clearing house. The credit card information may be flagged to indicate that use of and/or uses associated with the credit card information are of interest, and the information that may be received from the clearing house may indicate that use of and/or uses associated with the credit card information are of interest. This indication of use of and/or uses associated with the credit card information being of interest may be communicated through one or more flags in the authorization information, through one or more name-value pairs, and/or through one or more VSAs, among others.

If a probe is to be initiated to monitor and/or replicate network traffic of a computing device, then the probe is initiated at 670. Otherwise, at 680, a probe is not initiated.

Figure 7:
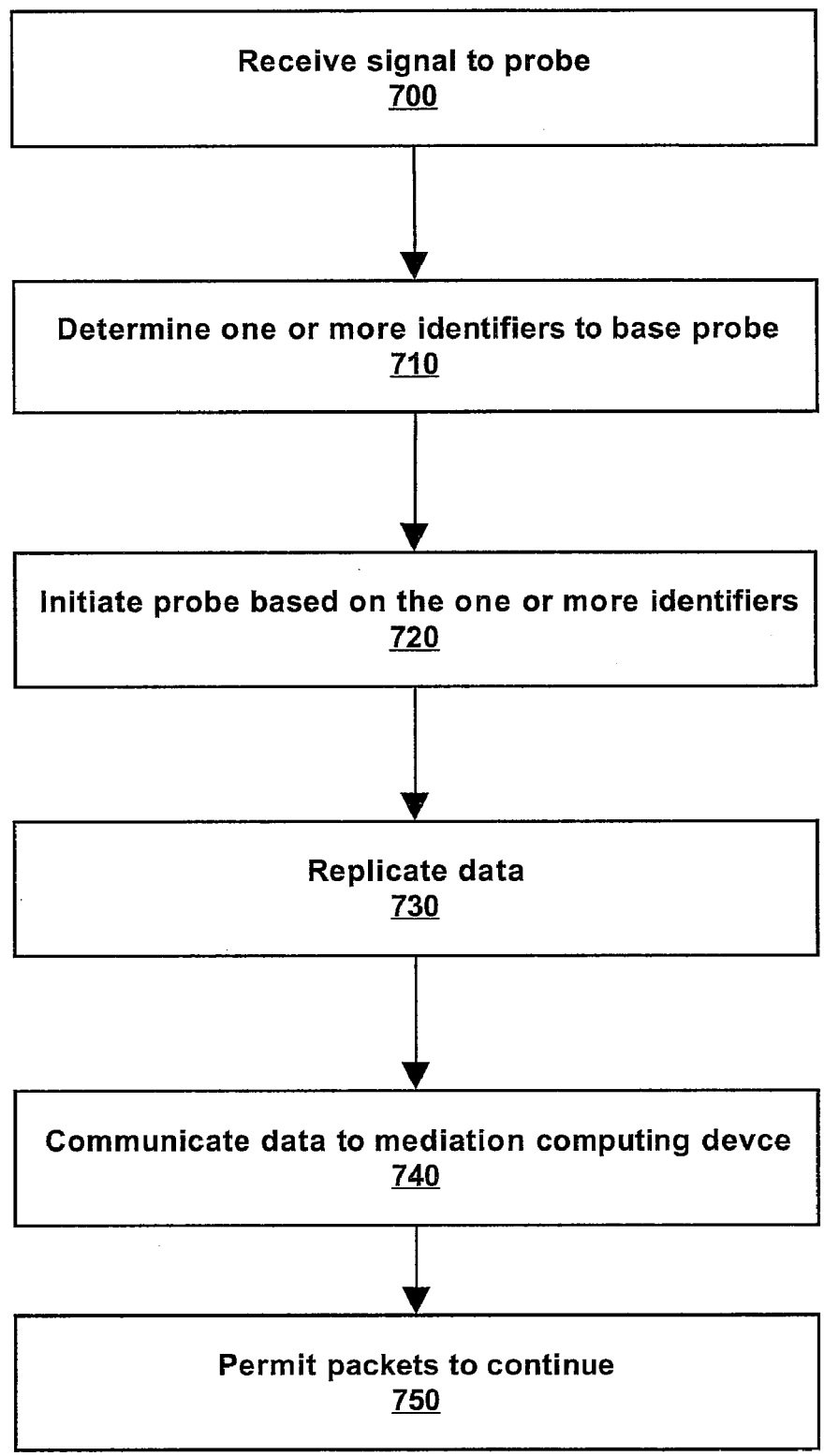
FIG. 7 is a flowchart diagram of a method, according to various embodiments.

Turning now to FIG. 7, a flowchart diagram of a method is illustrated, according to various embodiments. At 700, a signal to probe data (e.g., one or more packets) associated with a computing device may be received. For example, the signal to probe may be received by one of NMDs 105A-105D, RCDs 115A-115D, or RCD 116. At 710, one or more identifiers may be determined to which the probe may be based. In some embodiments, the probe may be based on a tag (e.g., a tunnel tag, a QoS tag, a VLAN tag, a network address, etc.). At 720, a probe may be initiated. In various embodiments, the initiated probe may filter one or more packets based on the determined one or more identifiers. At 730, the probe may replicate one or more packets associated with the determined one or more identifiers. At 740, the replicated one or more packets may be communicated to a MCD (e.g., one of MCDs 125A-125D). In some embodiments, the replicated one or more packets may be communicated to the MCD according to some protocol used by the MCD. In various embodiments, computing device identification information and one or more portions of payloads of the one or more replicated packets may be communicated to the MCD according to some protocol used by the MCD. At 750, the one or more packets associated with the determined one or more identifiers may be permitted to continue to each destination address of the one or more packets.

Figure 8:
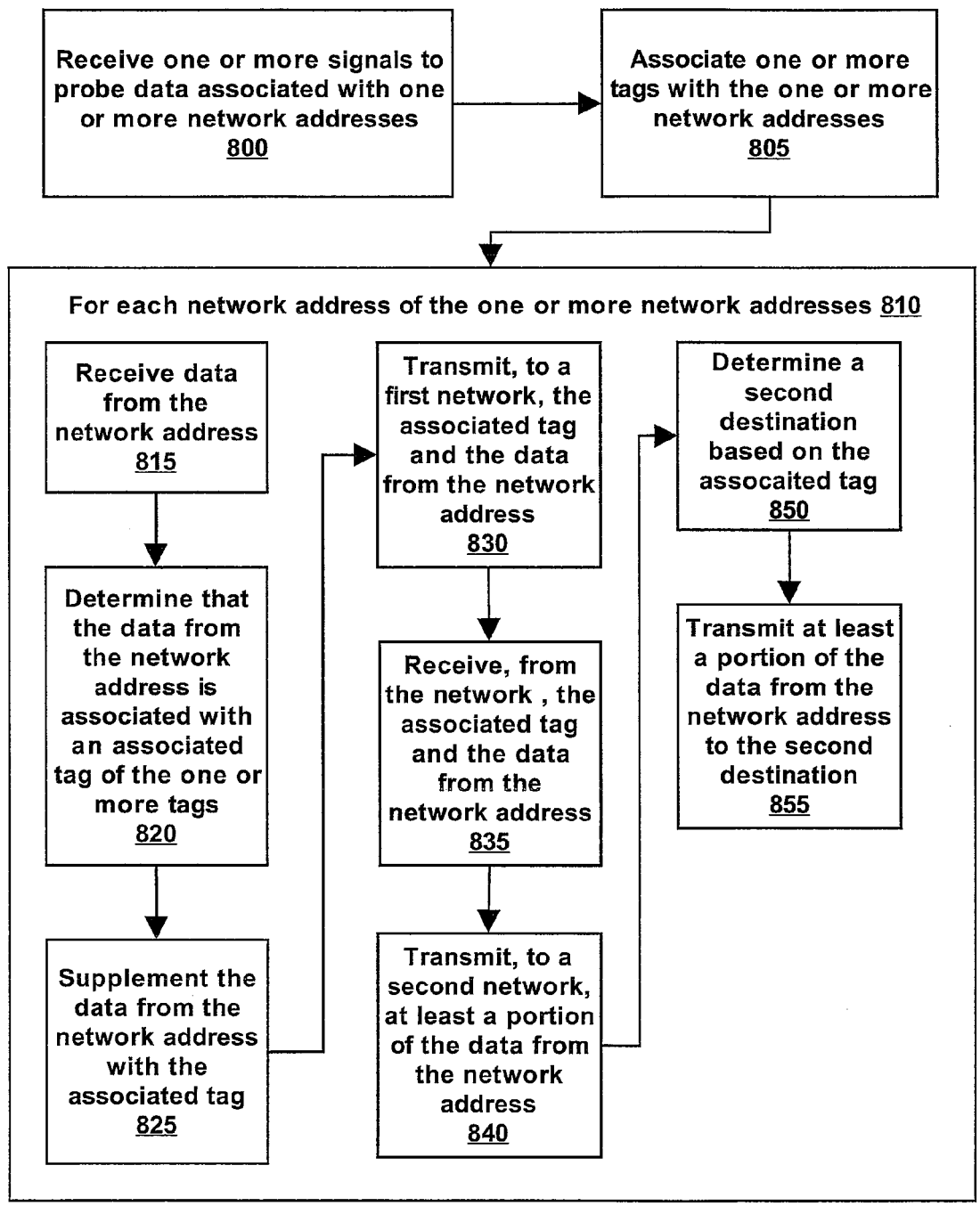
FIG. 8 is a flowchart diagram of a method, according to various embodiments.

Turning now to FIG. 8, a flowchart diagram of a method is illustrated, according to various embodiments. At 800, one or more signals to probe data associated with one or more network addresses may be received. In some embodiments, the one or more network addresses may include one or more private network addresses. In various embodiments, each network address of the one or more network addresses is different from another network address of the one or more network addresses. Next at 805, one or more tags may be respectively associated with the one or more network addresses. In some embodiments, each tag of the one or more tags may be different from another tag of the one or more tags.

In various embodiments, at 810, for each network address of the one or more network addresses, method elements 815-855 may be performed for the network address. At 815, data from the network address may be received, and an associated tag of the one or more tags that corresponds to the network address may be determined at 820. The tag associated with the network address may be supplemented and/or added to the data from the network address at 825, and at 830, the data from the network address and the associated tag may be transmitted to a first network. For example, the first network may include one of networks 130A-130D and 133. At 835, the associated tag and the data from the first network address may be received. In some embodiments, one of NMDs 105A-105D, RCDs 115A-115D, and RCD 116 may receive the associated tag and the data from the first network address.

At 840, at least a portion of the data from the network address may be transmitted to a second network. In some embodiments, the data from the network address may include a destination address of the second network. For example, the second network may include network 135. At 850, a second destination may be determined, based on the associated tag. In some embodiments, the second destination may include a second network address. For example, the second network address may include an address of network 135. For instance, the second network address may be associated with a mediation computing device (e.g., one of MCDs 125A-125D). In various embodiments, the second destination may include an address of a storage device. For example, the storage device may be included in one of NMDs 105A-105D, and the address of the storage device may include a hardware address. In some embodiments, the address of the storage device may be associated with a network storage device, a storage area network, and/or a network area storage, among others. In various embodiments, the second destination may include an address associated with local cache device 162. At 855, the at least the portion of the data from the network address may be transmitted to the second destination.

Figure 9A:
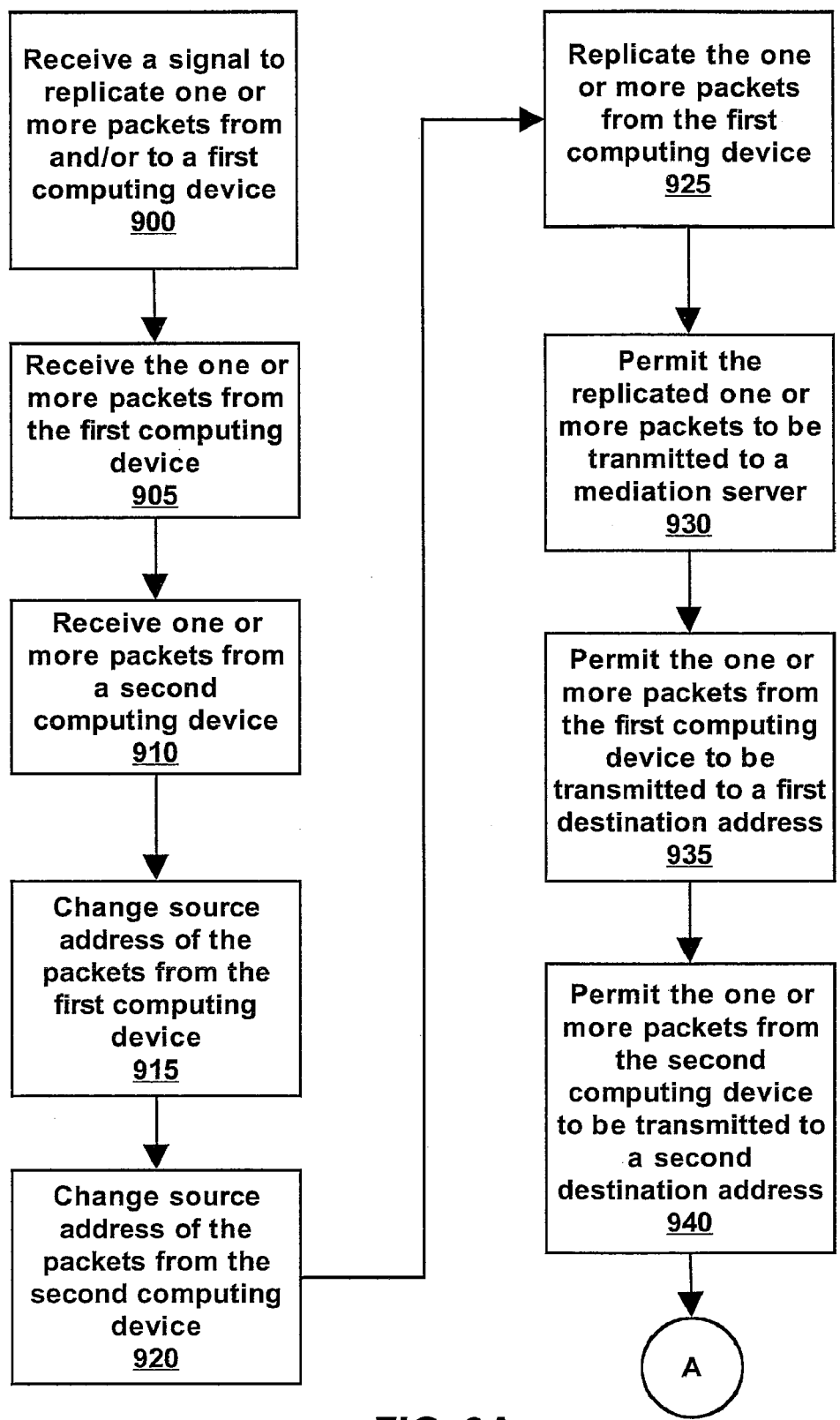
FIGS. 9A and 9B are a flowchart diagram of a method, according to various embodiments.
Figure 9B:
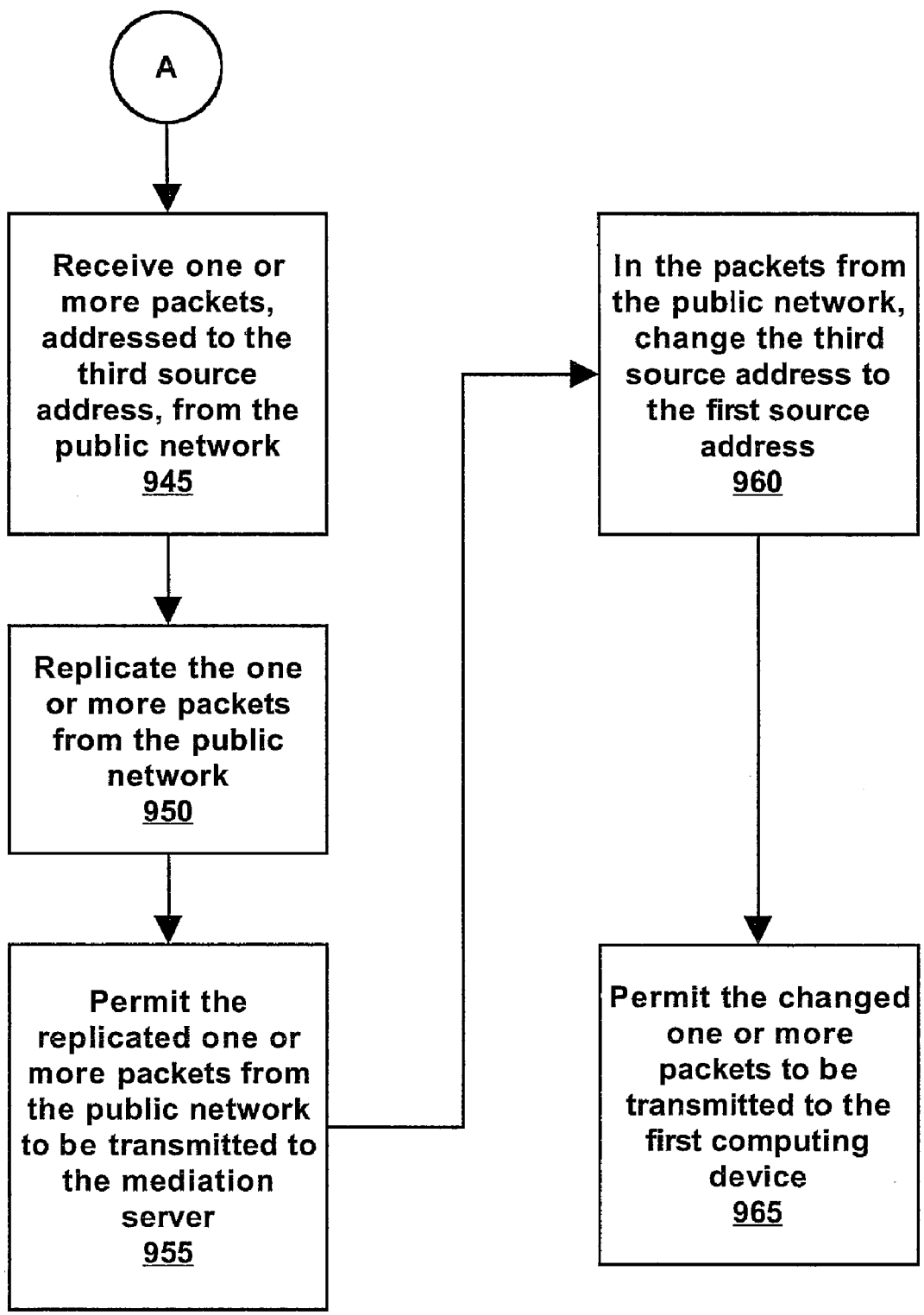

Turning now to FIGS. 9A and 9B, a flowchart diagram of a method is illustrated, according to various embodiments. At 900, a signal to replicate one or more packets from and/or to a first computing device may be received, and, at 905, one or more packets from the first computing device may be received. In various embodiments, the first computing device may be coupled to a first network. For example, the first network may include one of networks 130A-130D. In some embodiments, the one or more packets from the first computing device may include a first source address and/or a first destination address. In one example, the first source address may include a private network address, and the first destination address may include a first public network address.

At 910, one or more packets may be received from a second computing device. In some embodiments, the second computing device may be coupled to a second network. For example, the second network may include one of networks 130A-130D which is not the first network. In various embodiments, the first network may be located at a first geographic location and the second network may be located at a second, different, geographic location. In some embodiments, the first network and the second network may be included in a single physical network. For example, the first network may include a first VLAN, and the second network may include a second, different, VLAN.

In various embodiments, the one or more packets from the second computing device may include a second source address and/or a second destination address. In one example, the second source address may include a private network address, and the second destination address may include a second public network address or the first public network address.

At 915, the first source address of each packet of the one or more packets from the first computing device may be changed to a third source address. In some embodiments, the third source address may be changed to a public network address. For example, the third source address may be an address of network 135. In various embodiments, this may create first changed one or more packets. At 920, the second source address of each packet of the one or more packets from the second computing device may be changed to a fourth source address. In some embodiments, the fourth source address may be changed to a public network address. For example, the fourth source address may be an address of network 135. In various embodiments, this may create second changed one or more packets.

At 925, the first changed packets may be replicated. In various embodiments, this may create first replicated one or more packets. Next at 930, the first replicated packets may be permitted to be transmitted to a mediation server. For example, the mediation server may include one of MCDs 125A-125D.

Next at 935, the first changed one or more packets may be permitted to be transmitted to the first destination address, and the second changed one or more packets may be permitted to be transmitted to the second destination address at 940.

At 945, one or more packets from the public network may be received. In some embodiments, the one or more packets form the public network may include a destination address that includes the third source address. At 950, the one or more packets from the public network may be replicated based on the destination address that includes the third source address. In various embodiments, this may create second replicated one or more packets. At 955, the second replicated one or more packets may be permitted to be transmitted to the mediation server.

At 960, the destination address of the one or more packets from the public network may be changed to the first source address. In various embodiments, this may create third changed one or more packets. Next at 965, the third changed one or more packets may be permitted to be transmitted to the first computing device.

Figure 10:
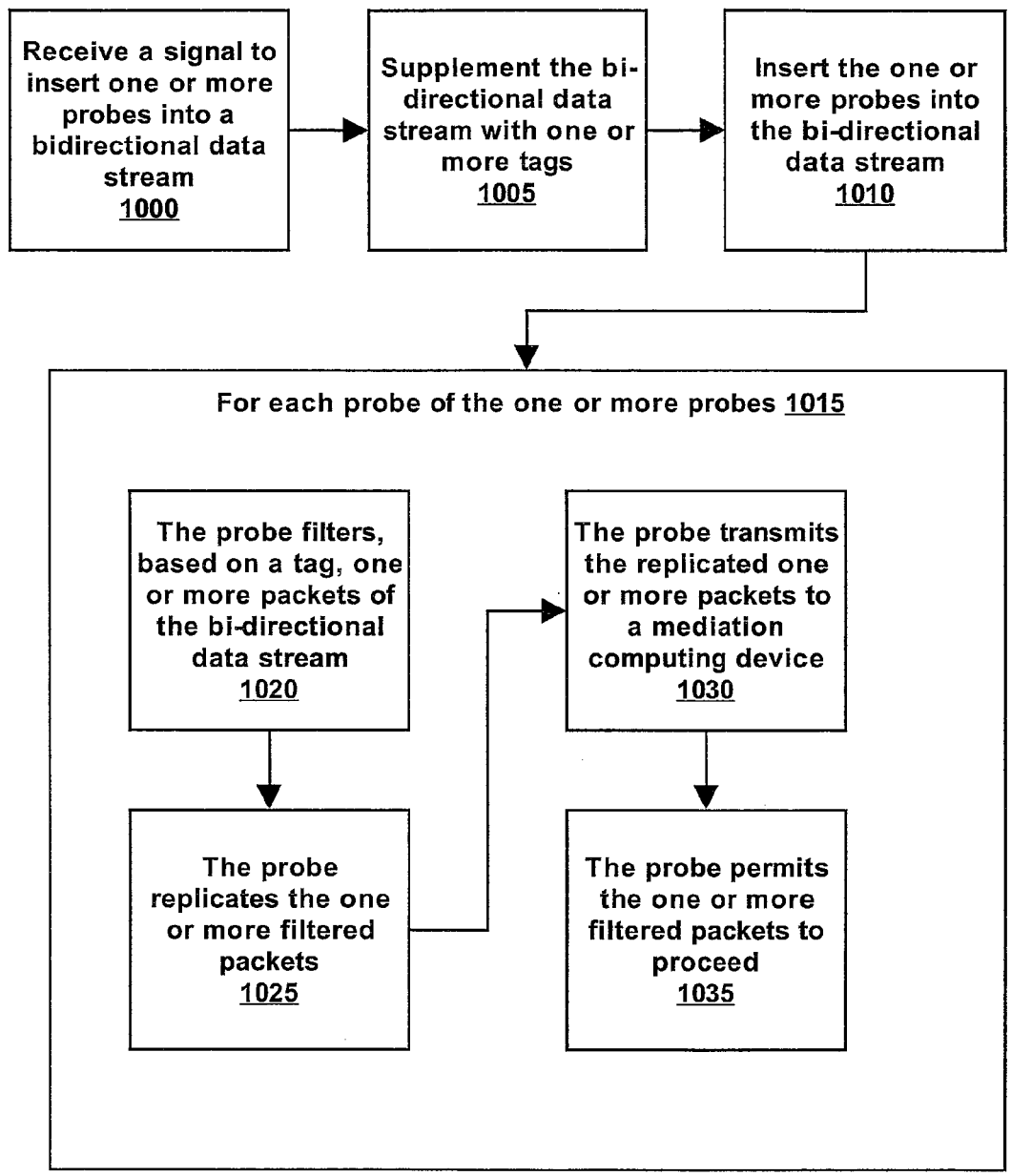
FIG. 10 is a flowchart diagram of a method, according to various embodiments.

Turning now to FIG. 10, a flowchart diagram of a method is illustrated, according to various embodiments. At 1000, a signal may be received to insert one or more probes into a bi-directional data stream. In some embodiments, the signal may be received by one of NMDs 105A-105D, RCDs 115A-115D, or RCD 116 from one of MCDs 125A-125D. In various embodiments, the bi-directional data stream may aggregate one or more private networks, and each of the private networks may include one or more private addresses. In some embodiments, a network may be considered to be a private network because it supports one or more uses of one or more private addresses, even though it may support one or more uses of one or more public addresses, as well.

At 1005, the bi-directional data stream may be supplemented with one or more tags. In some embodiments, each tag of the one or more tags may correspond to a private network address. At 1010, the one or more probes may be inserted into the bi-directional data stream where each of the one or more probes may be inserted between one of the one or more private networks and a public network. In one example, one or more of probes 510A-510F may be inserted into bi-directional data stream 500A and between network 130A and network 135. Since network 130A may support one or more uses of one or more private addresses, it may be considered a private network, in some embodiments. In another example, one or more of probes 510G-510I may be inserted into bi-directional data stream 505.

In various embodiments, at 1015, for each probe of the one or more probes, method elements 1020-1035 may be performed for the probe. At 1020, the probe may filter one or more packets of the bi-directional data stream. In some embodiments, filtering the one or more packets may include basing the filtering on a tag that corresponds to the one or more packets. For example, the tag may correspond to a private network address, and the one or more packets associated with and/or corresponding to the tag may be filtered. In various embodiments, filtering may include isolating the one or more packets associated with and/or corresponding to the tag such that other packets in the bi-directional data stream are effectively unaffected, unmarked, and/or unaltered and may traverse the bi-directional stream with little or no effect from the probe. At 1025, the filtered one or more packets may be replicated by the probe, and the probe may transmit the replicated one or more packets to a MCD (e.g., one of MCDs 125A-125D). At 1035, the probe may permit the one or more packets to proceed traversing the bi-directional data stream. In some embodiments, filtering, replicating, and permitting the one or more filtered packets may be performed with little or no appreciation and/or realization to a user operating a computing device that is associated with the one or more filtered packets and/or the probe.

It is noted that, in various embodiment, one or more of the method elements described herein and/or one or more portions of an implementation of a method element may be performed in varying orders, may be performed concurrently with one or more of the other method elements and/or one or more portions of an implementation of a method element, or may be omitted. Additional method elements may be performed as desired. In various embodiments, concurrently may mean simultaneously. In some embodiments, concurrently may mean apparently simultaneously according to some metric. For example, two or more method elements and/or two or more portions of an implementation of a method element may be performed such that they appear to be simultaneous to a human. It is also noted that, in various embodiments, one or more of the system elements described herein may be omitted and additional system elements may be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
    associating a first tag with a source network address utilized by a first computing device associated with first identification information;
    associating a second tag, different from the first tag, with the source network address utilized by a second computing device, different from the first computing device, associated with second identification information, different from the first identification information;
    receiving first data from the first computing device utilizing the source network address;
    determining that the first data is associated with the first tag;
    supplementing the first data with the first tag;
    receiving second data from the second computing device utilizing the source network address;
    determining that the second data is associated with the second tag;
    supplementing the second data with the second tag;
    transmitting, to a network device, the first data supplemented with the first tag;
    transmitting, to the network device, the second data supplemented with the second tag;
    transmitting at least a portion of the first data identified by the first tag to a first destination address of a network, wherein transmitting the at least the portion of the first data includes using a source network address of a gateway;
    determining a second destination based on the first tag;
    transmitting the at least the portion of the first data identified by the first tag to the second destination;
    transmitting at least a portion of the second data identified by the second tag to a third destination address of the network, wherein transmitting the at least the portion of the second data includes using the source network address of the gateway;
    determining the second destination based on the second tag; and
    transmitting the at least the portion of the second data identified by the second tag to the second destination.

2. The method of claim 1, wherein the source network address includes a temporary address.

3. The method of claim 1, wherein the source network address includes a private network address.

4. The method of claim 1, wherein at least one of the first tag and the second tag includes a quality of service tag that does not affect a quality of service respectively associated with at least the first computing device and the second computing device.

5. The method of claim 4, wherein the quality of service tag includes an Institute of Electrical and Electronics Engineers (IEEE) 802.1p tag.

6. The method of claim 1, wherein the second destination includes a destination address of a storage device.

7. The method of claim 1, wherein the second destination includes a destination address of a mediation computing device.

8. The method of claim 1, wherein the network includes an Internet.

9. The method of claim 1, wherein at least one of the first computing device and the second computing device is a portable computing device.

10. The method of claim 1, further comprising:
    receiving one or more signals to probe data associated with at least one of the first tag and the second tag;
    wherein at least one of the one or more signals to probe the data associated with the at least one of the first tag and the second tag is based on at least a portion of information of an authorization signal.

11. The method of claim 1, wherein at least one of the first tag and the second tag includes a tunnel tag.

12. A computer readable memory device comprising instructions, which when executed on a processing system, cause the processing system to perform:
    associating a first tag with a source network address utilized by a first computing device associated with first identification information;
    associating a second tag, different from the first tag, with the source network address utilized by a second computing device, different from the first computing device, associated with second identification information, different from the first identification information;

receiving first data from the first computing device utilizing the source network address;
determining that the first data is associated with the first tag;
supplementing the first data with the first tag;
receiving second data from the second computing device utilizing the source network address;
determining that the second data is associated with the second tag;
supplementing the second data with the second tag;
transmitting, to a network device, the first data supplemented with the first tag;
transmitting, to the network device, the second data supplemented with the second tag;
transmitting at least a portion of the first data to a first destination address of a network, wherein transmitting the at least the portion of the first data includes using a source network address of a gateway;
determining a second destination based on the first tag;
transmitting the at least the portion of the first data to the second destination;
transmitting at least a portion of the second data identified by the second tag to a third destination address of the network, wherein transmitting the at least the portion of the second data includes using the source network address of the gateway;
determining the second destination based on the second tag; and
transmitting the at least the portion of the second data identified by the second tag to the second destination.

13. The computer readable memory device of claim 12, wherein the source network address includes a temporary address.

14. The computer readable memory device of claim 12, wherein the source network address includes a private network address.

15. The computer readable memory device of claim 12, wherein the first tag includes a quality of service tag that does not affect a quality of service associated with the first computing device.

16. The computer readable memory device of claim 15, wherein the quality of service tag includes an Institute of Electrical and Electronics Engineers (IEEE) 802.1p tag.

17. The computer readable memory device of claim 12, wherein the second destination includes a destination address of a storage device.

18. The computer readable memory device of claim 12,
wherein the network includes an Internet;
wherein the first destination address of the network includes a first Internet protocol address; and
wherein the third destination address of the network includes a second Internet protocol address, different from the first Internet protocol address.

19. The computer readable memory device of claim 12, wherein at least one of the first computing device and the second computing device is a portable computing device.

20. The computer readable memory device of claim 12, wherein the instructions, which when executed on a processing system, cause the processing system to further perform:
receiving one or more signals to probe data associated with the first identification information;
wherein at least one of the one or more signals to probe the data associated with the first identification information is based on at least a portion of information of an authorization signal.

21. The computer readable memory device of claim 12, wherein at least one of the first tag and the second tag includes a tunnel tag.

22. A system, comprising:
a first network;
a first network device coupled to the first network;
a second network;
a second network device coupled to the second network;
a routing computing device coupled to the first network device, coupled to the second network device, and configured to be coupled to a third network;
wherein the first network device includes a first processor and a first memory device coupled to the first processor of the first network device;
wherein the first memory device of the first network device includes instructions, which when executed by the first processor of the first network device, cause the first network device to perform:
  associating a first tag with a source network address utilized by a first computing device associated with first identification information;
  receiving first data from the first computing device utilizing the source network address;
  determining that the first data is associated with the first tag;
  supplementing the first data with the first tag; and
  transmitting, to the routing computing device, the first data supplemented with the first tag;
wherein the second network device includes a second processor and a second memory device coupled to the second processor of the second network device;
wherein the second memory device of the second network device includes instructions, which when executed by the second processor of the second network device, cause the second network device to perform:
  associating a second tag, different from the first tag, with the source network address utilized by a second computing device, different from the first computing device, associated with second identification information, different from the first identification information;
  receiving second data from the second computing device utilizing the source network address;
  determining that the second data is associated with the second tag;
  supplementing the second data with the second tag; and
  transmitting, to the routing computing device, the second data supplemented with the second tag;
wherein the routing computing device includes a processor and a memory device coupled to the processor of the routing computing device; and
wherein the memory device of the routing computing device includes instructions, which when executed by the processor of the routing computing device, cause the routing computing device to perform:
  receiving the first data supplemented with the first tag;
  transmitting at least a portion of the first data to a first destination address of the third network, wherein transmitting the at least the portion of the first data to the first destination address includes using a source network address of the routing computing device;
  determining a second destination based on the first tag;
  transmitting the at least the first portion of the first data to the second destination;
  receiving the second data supplemented with the second tag; and transmitting at least a portion of the second data to a third destination address of the third network, wherein transmitting the at least the portion of the second data to the third destination address includes using the source network address of the routing computing device.

23. The system of claim 22,
wherein the third network includes an Internet;
wherein the first destination address includes a first Internet protocol address; and
wherein the source network address of the routing computing device includes a second Internet protocol address, different from the first Internet protocol address.

24. The system of claim 22, wherein the source network address includes a temporary address.

25. The system of claim 22, wherein source network address includes a private network address.

26. The system of claim 22, wherein the first tag includes a quality of service tag that does not affect a quality of service associated with the first computing device.

27. The system of claim 26, wherein the quality of service tag includes an Institute of Electrical and Electronics Engineers (IEEE) 802.1p tag.

28. The system of claim 22, wherein the second destination includes a destination address of a storage device.

29. The system of claim 22, wherein at least one of the first tag and the second tag is associated with a portable computing device.

30. The system of claim 22, wherein the first memory device of the first network device device further includes instructions, which when executed by the processor of the first network device device, cause the first network device to perform:
receiving one or more signals to probe data associated with the first identification information;
wherein at least one of the one or more signals to probe the data associated with the first identification information is based on at least a portion of information of an authorization signal.

31. The system of claim 22, wherein the memory device of the routing computing device further includes instructions, which when executed by the processor of the routing computing device, cause the routing computing device to perform:
receiving one or more signals to probe data associated with the first identification information;
wherein at least one of the one or more signals to probe data associated with the first identification information is based on at least a portion of information of an authorization signal.

32. The system of claim 22, wherein at least one tag of the first tag and the second tag includes a tunnel tag.

* * * * *